(12) United States Patent
Iwamoto

(10) Patent No.: US 10,663,703 B2
(45) Date of Patent: May 26, 2020

(54) ZOOM LENS AND IMAGE PICKUP APPARATUS

(71) Applicant: CANON KABUSHIKI KAISHA, Tokyo (JP)

(72) Inventor: Shunji Iwamoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/029,109

(22) Filed: Jul. 6, 2018

(65) Prior Publication Data

US 2019/0011682 A1    Jan. 10, 2019

(30) Foreign Application Priority Data

Jul. 10, 2017 (JP) ................................ 2017-134419
Jun. 6, 2018 (JP) ................................ 2018-108495

(51) Int. Cl.
*G02B 15/163* (2006.01)
*G02B 27/00* (2006.01)
(Continued)

(52) U.S. Cl.
CPC ........... *G02B 15/163* (2013.01); *G02B 13/02* (2013.01); *G02B 15/17* (2013.01); *G02B 27/0025* (2013.01)

(58) Field of Classification Search
CPC ...... G02B 15/163; G02B 15/17; G02B 13/02; G02B 27/0025; G02B 15/173
See application file for complete search history.

(56) References Cited

U.S. PATENT DOCUMENTS 6,437,923 B1    8/2002  Yamada
9,217,851 B2   12/2015  Iwamoto
(Continued)

FOREIGN PATENT DOCUMENTS

EP      1881357 A1    1/2008
JP    S61236516 A   10/1986
(Continued)

OTHER PUBLICATIONS

Great Britian Extended Search Report for Application No. 1811268.0 dated Jan. 10, 2019.
(Continued)

*Primary Examiner* — Joseph P Martinez
(74) *Attorney, Agent, or Firm* — Carter, DeLuca, & Farrell LLP

(57) ABSTRACT

A zoom lens includes lens units whose interval between adjacent units is changed during zooming, wherein the lens units consist of, in order from an object side, a positive first unit, an negative intermediate lens group including a unit, a positive (n−1)-th unit, and a positive n-th unit, wherein the first unit moves during zooming, wherein an interval between the (n−1)-th and n-th units is smaller at telephoto end than at wide angle end, wherein the n-th unit includes positive lenses LPL made of a material having proper Abbe number, wherein the n-th lens unit includes a positive lens LPH arranged on the image side of the lenses LPL and made of a material having proper refractive index and wherein a distance between lens surfaces on the most-object side and on the most-image side of the n-th lens unit, and back focus at the wide angle end are properly set.

19 Claims, 12 Drawing Sheets

(51) Int. Cl.
    *G02B 13/02*    (2006.01)
    *G02B 15/17*    (2006.01)

(56) References Cited

U.S. PATENT DOCUMENTS

| | | | |
|---|---|---|---|
| 2013/0201370 A1* | 8/2013 | Hatada | G02B 15/14 348/294 |
| 2014/0055659 A1 | 2/2014 | Iwamoto | |
| 2017/0199356 A1 | 7/2017 | Iwamoto | |
| 2017/0276917 A1 | 9/2017 | Iwamoto | |
| 2018/0284406 A1 | 10/2018 | Iwamoto | |
| 2019/0004277 A1 | 1/2019 | Iwamoto | |

FOREIGN PATENT DOCUMENTS

| | | |
|---|---|---|
| JP | 2006184430 A | 7/2006 |
| JP | 2008089991 A | 4/2008 |
| JP | 2010217838 A | 9/2010 |
| JP | 2013221999 A | 10/2013 |
| WO | 2016104742 A1 | 6/2016 |

OTHER PUBLICATIONS

Japanese Office Action for Application No. 2018-108495 dated Apr. 16, 2019 with English translation.
German Office Action for counterpart application No. 102018116415.7 dated Mar. 30, 2020 (4 pages).
(Machine Translation by Google Translate: https://translate.google.com/?hl=en&tab=TT) English translation of German Office Action p. 4, dated Mar. 30, 2020, Case number: 10 2018 116 415.7.
(Machine Translation by WIPO Translation: https://patentscope.wipo.int/translate/translate.jsf) English translation of German Office Action p. 4, dated Mar. 30, 2020, File: 10 201 8 116 415.7.

* cited by examiner

ZOOM LENS AND IMAGE PICKUP APPARATUS

BACKGROUND OF THE INVENTION

Field of the Invention

The present invention relates to a zoom lens and an image pickup apparatus, and more particularly, to a zoom lens that is suitable as an image pickup optical system for use with an image pickup apparatus, for example, a still camera, a video camera, a digital still camera, a TV camera, or a monitoring camera.

Description of the Related Art

In recent years, it is required that an image pickup optical system for use with an image pickup apparatus using an image pickup element be a zoom lens having a short total length (distance from the first lens surface to an image plane), a small size of an entire system, and a high aperture ratio. It is also required that the zoom lens satisfactorily correct chromatic aberration, in particular, of various aberrations, and have high optical performance over an entire zoom range.

As a zoom lens that satisfies the above-mentioned requirements, there has been known a four-unit zoom lens of a positive-lead type, which consists of, in order from an object side to an image side, first to fourth lens units having positive, negative, positive, and positive refractive powers, respectively (U.S. Patent Application Publication No. 2013/0201370). In U.S. Patent Application Publication No. 2013/0201370, an interval between each pair of adjacent lens units is changed during zooming. Further, in U.S. Patent Application Publication No. 2013/0201370, there is disclosed a zoom lens in which a positive lens made of a low dispersion material is used in the fourth lens unit to correct chromatic aberration.

In recent years, when refractive powers of lens units forming the zoom lens are increased in order to downsize a zoom lens, large axial chromatic aberration is generated, for example, and axial chromatic aberration is increased at a telephoto end, in particular.

In the above-mentioned zoom lens of the positive-lead type, in order to satisfactorily correct chromatic aberration and obtain the high optical performance while downsizing the entire system of the zoom lens and securing the high aperture ratio, it is important to appropriately set each element forming the zoom lens. For example, it is important to appropriately set a zoom type (the number of lens units and signs of the refractive powers of the lens units), lens configurations of the lens units, and other such elements.

In particular, it is important to appropriately set the lens configuration of the fourth lens unit, and when the lens configuration of the fourth lens unit is not appropriate, the entire system of the zoom lens is increased in size in achieving a large aperture. Moreover, a variation in chromatic aberration accompanying zooming is increased, and it becomes difficult to obtain the high optical performance over the entire zoom range.

SUMMARY OF THE INVENTION

According to one embodiment of the present invention, there is provided a zoom lens including a plurality of lens units, in which an interval between each pair of adjacent lens units is changed during zooming, wherein the plurality of lens units consist of, in order from an object side to an image side, a first lens unit having a positive refractive power, an intermediate lens group including at least one lens unit and having a negative refractive power as a whole, an (n−1)-th lens unit having a positive refractive power, and an n-th lens unit having a positive refractive power, wherein the first lens unit is configured to move during zooming, wherein an interval between the (n−1)-th lens unit and the n-th lens unit is smaller at a telephoto end than at a wide angle end, wherein the n-th lens unit includes a plurality of positive lenses LPL made of a material that satisfies the following conditional expression:

$$65.0 < vd < 97.0,$$

where vd is an Abbe number of the material of the plurality of positive lenses LPL, wherein the n-th lens unit includes a positive lens LPH arranged on the image side of the plurality of positive lenses LPL and made of a material that satisfies the following conditional expression:

$$1.84 < Nd < 2.20,$$

where Nd is a refractive index of the material of the positive lens LPH, and wherein the following conditional expression is satisfied:

$$1.1 < tn/skw < 10.0,$$

where tn is a distance on an optical axis from a lens surface closest to the object side of the n-th lens unit to a lens surface closest to the image side of the n-th lens unit, and skw is a back focus at the wide angle end.

Further features of the present invention will become apparent from the following description of exemplary embodiments with reference to the attached drawings.

DESCRIPTION OF THE EMBODIMENTS

Figure 1:
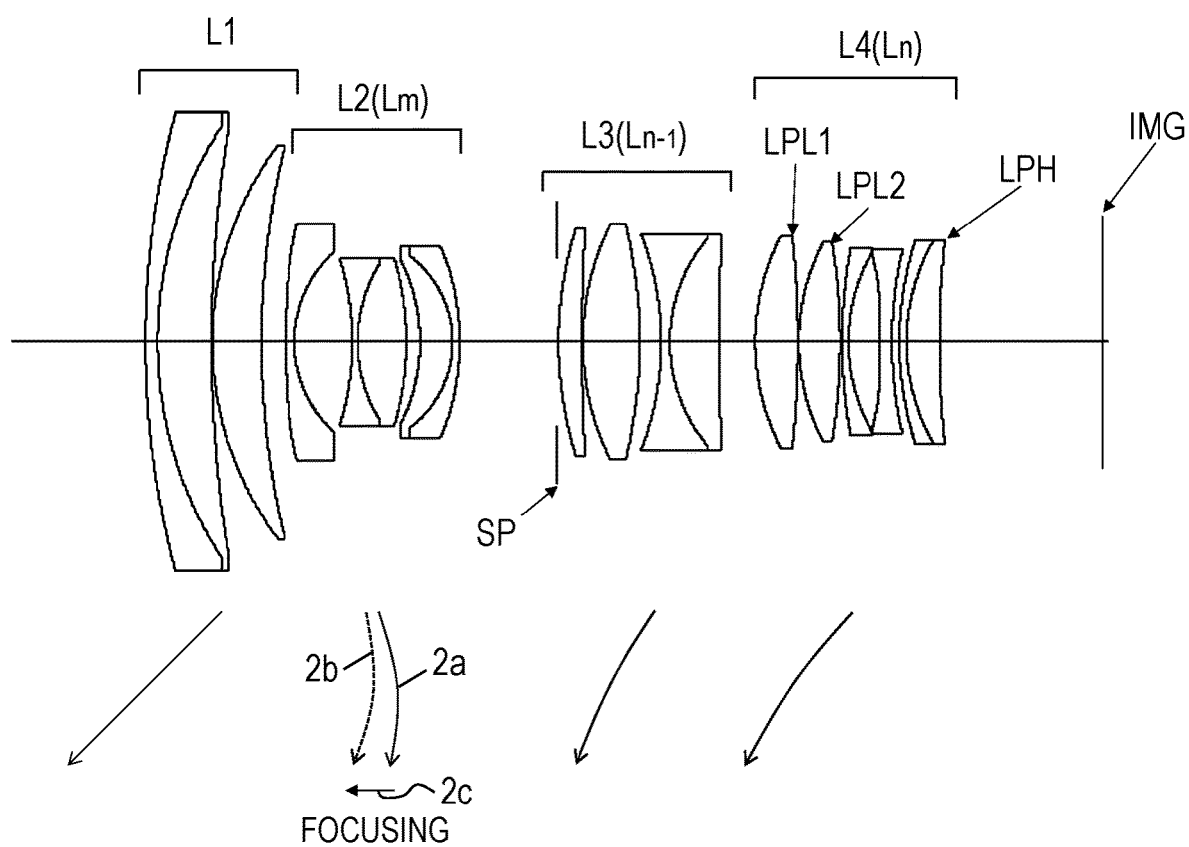
FIG. 1 is a lens cross-sectional view in Example 1 of the present invention at a wide angle end.

Preferred embodiments of the present invention will now be described in detail in accordance with the accompanying drawings.

Now, exemplary embodiments of the present invention are described in detail with reference to the accompanying drawings.

In this specification, a "back focus" is a distance on an optical axis from the last lens surface to a paraxial image plane, which is expressed in an air-equivalent length. A "total length of the zoom lens" is a length obtained by adding the back focus to a distance on the optical axis from the front surface (lens surface closest to an object side) to the last surface (lens surface closest to an image side) of a zoom lens. A wide angle end indicates a state in which a focal length of the zoom lens is shortest, and a telephoto end indicates a state in which the focal length of the zoom lens is longest.

A zoom lens according to each of Examples of the present invention is an image pickup optical system for use with an image pickup apparatus, for example, a video camera, a digital camera, or a TV camera. Alternatively, the zoom lens according to each of Examples may be used as a projection optical system for an image projection apparatus (projector). In lens cross-sectional views of FIG. 1, FIG. 3, FIG. 5, FIG. 7, and FIG. 9, the left side is the object side (front), and the right side is the image side (rear). Moreover, in the lens cross-sectional views, symbol Li represents the i-th lens unit, where "i" is the order of a lens unit from the object side.

An aperture stop SP is configured to determine (restrict) a light flux at a minimum f-number (Fno). An image plane IMG corresponds to an image pickup surface of a solid-state image pickup element (photoelectric conversion element), for example, a CCD sensor or a CMOS sensor when the zoom lens is used as a photographing optical system of a video camera or a network camera. The arrows indicate movement loci of the respective lens units during zooming (magnification varying) from the wide angle end to the telephoto end.

The arrow concerning focusing indicates a movement direction of each lens unit during focusing from infinity to proximity.

Of the aberration diagrams of FIG. 2A, FIG. 2B, FIG. 2C, FIG. 4A, FIG. 4B, FIG. 4C, FIG. 6A, FIG. 6B, FIG. 6C, FIG. 8A, FIG. 8B, FIG. 8C, FIG. 10A, FIG. 10B, and FIG. 10C, in spherical aberration, a solid line "d" represents a d-line (587.6 nm), and a broken line "g" represents a g-line (435.8 nm). Moreover, in the diagrams for illustrating astigmatism, a solid line S represents a sagittal direction of the d-line, and a broken line M represents a meridional direction of the d-line. Moreover, in the diagrams for illustrating distortion, distortion on the d-line is expressed. The broken line in the diagrams for illustrating the chromatic aberration of magnification indicates chromatic aberration of magnification with respect to the d-line. Symbol Fno indicates an f-number, and symbol "ω" represents a half angle of view (degrees) of a photographing angle of view.

A zoom lens according to an Example of the present invention includes a plurality of lens units, in which an interval between each pair of adjacent lens units is changed during zooming. The plurality of lens units consist of, in order from the object side to the image side, a first lens unit L1 having a positive refractive power, an intermediate lens group $L_m$ including at least one lens unit and having a negative refractive power as a whole, an (n−1)th lens unit $L_{n-1}$ having a positive refractive power, and an n-th lens unit $L_n$ having a positive refractive power. In other words, the (n−1)th lens unit $L_{n-1}$ is the second lens unit as counted from the image side, and the n-th lens unit $L_n$ is a lens unit arranged closest to the image side. The intermediate lens group $L_m$ has the negative refractive power over an entire zoom range.

The first lens unit is configured to move during zooming. Then, an interval between the (n−1)th lens unit $L_{n-1}$ and the n-th lens unit $L_n$ is smaller at the telephoto end than at the wide angle end. Through zooming as described above, a movement amount of the n-th lens unit is increased to achieve a high zoom ratio, and the zoom lens is downsized. Further, the interval between the (n−1)th lens unit and the n-th lens unit is set smaller at the telephoto end than at the wide angle end, with the result that a variation in astigmatism can be reduced during zooming as compared to a case in which the interval is set larger. As a result, the zoom lens having a large aperture can be obtained.

When a larger aperture is to be achieved in the zoom lens, axial chromatic aberration is increased, and a Petzval sum is also increased. In view of this, in order to reduce axial chromatic aberration, a plurality of positive lenses made of a low dispersion material are arranged in the n-th lens unit.

Meanwhile, the low dispersion material generally has a low refractive index. Therefore, when the plurality of positive lenses made of the low dispersion material are arranged in the n-th lens unit, which is arranged closest to the image side of the plurality of lens units, to achieve the large aperture while reducing axial chromatic aberration, the Petzval sum is increased to a positive value, and field curvature is generated in a direction of undercorrection. In order to generate the Petzval sum in a negative direction, it is preferred to arrange the intermediate lens group $L_m$ having a strong negative refractive power, but with a mere increase in refractive power of the intermediate lens group $L_m$, it becomes disadvantageously difficult to reduce spherical aberration and astigmatism at the telephoto end.

Figure 11:
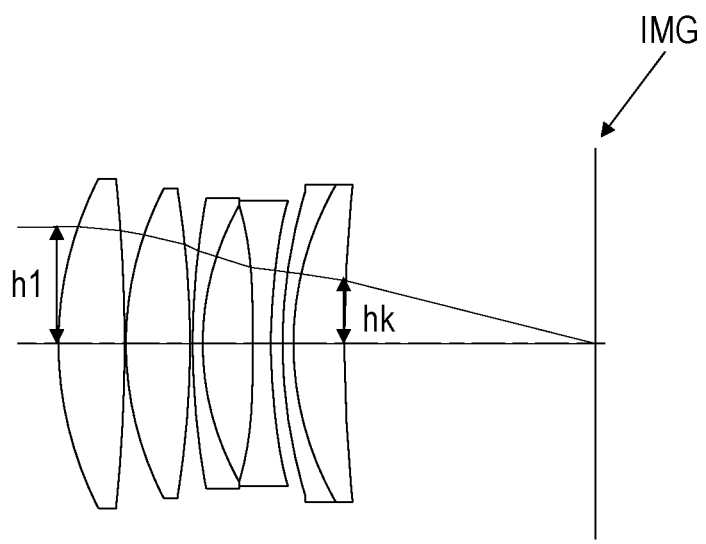
FIG. 11 is an optical path diagram of a part of Example 1.

FIG. 11 is an optical path diagram of a part of the lens cross-sectional view in Example 1 of the present invention. In FIG. 11, symbol h1 represents a height of incidence of an axial ray on a lens closest to the object side of the lens unit closest to the image side, and symbol "hk" represents a height of incidence of an axial ray that exits a lens closest to the image side of the lens unit closest to the image side. The height of incidence of the axial ray is zero at the image plane IMG, and is increased further away from the image plane IMG.

In the n-th lens unit $L_n$, the height of incidence of the axial light flux becomes lower as a lens is arranged closer to the image side, and the height of incidence of the axial light flux becomes higher as a lens is arranged further away from the image plane. Moreover, axial chromatic aberration is increased in contribution in proportion to the height of incidence of the axial ray.

Therefore, in the lens unit arranged closest to the image side, a lens arranged close to the image plane has a small contribution to axial chromatic aberration, and a lens arranged away from the image plane has a large contribution to axial chromatic aberration. Meanwhile, the Petzval sum has a constant contribution irrespective of the height of incidence of the axial ray.

In view of the above, in the zoom lens according to the Example, a plurality of positive lenses LPL made of a low dispersion material are arranged on the object side in the n-th lens unit $L_n$, and a positive lens LPH made of a material having a high refractive index is arranged on the image side of the plurality of positive lenses LPL. In this manner, the large aperture is achieved while axial chromatic aberration is reduced and the increase in Petzval sum is reduced.

In particular, in the zoom lens according to the Example, when a refractive index of the material is represented by Nd, and an Abbe number of the material is represented by vd, the n-th lens unit $L_n$ includes the plurality of positive lenses LPL made of a material that satisfies the following conditional expression:

$$65.0 < vd < 97.0 \tag{1}.$$

Further, the n-th lens unit $L_n$ includes the positive lens LPH that is arranged on the image side of the plurality of positive lenses LPL and satisfies the following conditional expression:

$$1.84 < Nd < 2.20 \tag{2}.$$

A distance on the optical axis from a lens surface closest to the object side of the n-th lens unit $L_n$ to a lens surface closest to the image side of the n-th lens unit $L_n$ is represented by "tn". A back focus of the zoom lens at the wide angle end is represented by "skw". At this time, the zoom lens according to the Example satisfies the following conditional expression:

$$1.1 < tn/skw < 10.0 \tag{3}.$$

In the zoom lens according to the Example, the lens units are configured to move such that an interval between the first lens unit L1 and a second lens unit L2 is larger, an interval between the second lens unit L2 and a third lens unit L3 is smaller, and an interval between the third lens unit L3 and a fourth lens unit L4 is smaller at the telephoto end than at the wide angle end. In particular, through reduction of the interval between the third lens unit L3 and the fourth lens unit L4 during zooming from the wide angle end to the telephoto end, the high zoom ratio is achieved and an entire system of the zoom lens is downsized while a variation in astigmatism accompanying zooming is reduced.

The positive lenses LPL that satisfy the conditional expression (1) are each represented by LPLi in order from the object side to the image side, where "i" represents the number as counted from the object side. Moreover, when the n-th lens unit $L_n$ includes a plurality of positive lenses made of a material that satisfies the conditional expression (2), the positive lens LPH is a positive lens arranged closest to the image side. The positive lens LPLi and the positive lens LPH may be a single lens or one lens that forms a cemented lens.

The conditional expression (1) is intended to satisfactorily correct axial chromatic aberration. When the value falls below the lower limit of the conditional expression (1), axial chromatic aberration is disadvantageously corrected unsatisfactorily. On the other hand, when the value exceeds the upper limit, it becomes disadvantageously difficult to obtain an appropriate optical material.

The conditional expression (2) is intended to reduce the Petzval sum. When the value falls below the lower limit of the conditional expression (2), the Petzval sum is increased in a positive direction, and large field curvature is disadvantageously generated in the direction of undercorrection. On the other hand, when the value exceeds the upper limit, it becomes disadvantageously difficult to obtain an appropriate optical material.

The conditional expression (3) defines a ratio of a thickness of the n-th lens unit $L_n$ to the back focus. When the ratio falls below the lower limit of the conditional expression (3), and the n-th lens unit $L_n$ becomes thinner, a difference in height of incidence of the axial ray between the lens arranged on the object side and the lens arranged on the image side in the n-th lens unit $L_n$ becomes smaller, and hence it becomes disadvantageously difficult to reduce the Petzval sum while correcting axial chromatic aberration. Moreover, when the thickness of the n-th lens unit $L_n$ is increased or the back focus is reduced so that the ratio exceeds the upper limit, an effective diameter of the lens closest to the image side is increased, and a weight of the zoom lens is disadvantageously increased.

It is preferred to set the numerical value ranges of the conditional expressions (1) to (3) as follows.

$$66.0 < vd < 96.0 \tag{1a}$$

$$1.90 < Nd < 2.06 \tag{2a}$$

$$1.13 < t4/skw < 4.00 \tag{3a}$$

It is preferred for the zoom lens according to the Example to satisfy one or more of conditional expressions provided below. A focal length of the n-th lens unit $L_n$ is represented by $f_n$, and a sum of refractive powers of the plurality of positive lenses LPL is represented by $\Sigma\Phi PL$. A refractive power of the positive lens LPH is represented by $\Phi LPH$. It should be noted, however, that when there are a plurality of the positive lenses LPH that satisfy the conditional expression (2), the refractive power $\Phi LPH$ is a refractive power of the positive lens closest to the image side. A focal length of the first lens unit L1 is represented by f1, and a focal length of the intermediate lens group $L_m$ at the wide angle end is represented by $f_m$. A focal length of the (n−1)th lens unit $L_{n-1}$ is represented by $f_{n-1}$. A focal length of the entire system of the zoom lens at the wide angle end is represented by $f_w$. A lateral magnification of the intermediate lens group $L_m$ at the telephoto end is represented by "βmt".

At this time, it is preferred to satisfy one or more of the following conditional expressions.

$$0.5 < f_n \times \Sigma\Phi LPL < 5.0 \tag{4}$$

$$0.2 < f_n \times \Phi LPH < 2.0 \tag{5}$$

$$-8.0 < f1/f_m < -4.0 \tag{6}$$

$$0.9 < f_{n-1}/f_n < 2.0 \tag{7}$$

$$-0.90 < f_m/f_w < -0.45 \tag{8}$$

$$1.1 < f_n/f_w < 1.9 \tag{9}$$

$$-0.6 < \beta mt < -0.2 \tag{10}$$

Next, technical meanings of the above-mentioned conditional expressions are described. The conditional expression (4) defines a relationship between the focal length of the n-th lens unit $L_n$ and the sum of positive refractive powers of all the positive lenses LPLi that are included in the n-th lens unit $L_n$ and are made of the material that satisfies the conditional expression (1). When the positive refractive powers of the positive lenses LPLi made of the material that satisfies the conditional expression (1) become stronger so that the value exceeds the upper limit of the conditional expression (4), it becomes disadvantageously difficult to correct spherical aberration at the telephoto end. On the other hand, when the positive refractive powers of the positive lenses LPLi made of the material that satisfies the conditional expression (1) become weaker so that the value falls below the lower limit, axial chromatic aberration is disadvantageously corrected unsatisfactorily.

The conditional expression (5) defines a relationship between the focal length of the n-th lens unit $L_n$ and the positive refractive power of the positive lens LPH. When the positive refractive power of the positive lens LPH becomes weaker so that the value falls below the lower limit of the conditional expression (5), the Petzval sum is increased in the positive direction, and field curvature is disadvantageously undercorrected. On the other hand, when the positive refractive power of the positive lens LPH becomes stronger so that the value exceeds the upper limit, the Petzval sum becomes excessive in the negative direction, and field curvature is disadvantageously overcorrected.

The conditional expression (6) defines a relationship between the focal lengths of the first lens unit L1 and the intermediate lens group $L_m$. When the focal length of the first lens unit L1 becomes longer and an absolute value of the negative focal length of the intermediate lens group $L_m$ becomes smaller so that the ratio falls below the lower limit of the conditional expression (6), a power arrangement becomes so-called retrofocus overly, and the total length of the zoom lens is disadvantageously increased. On the other hand, when the focal length of the first lens unit L1 becomes shorter and the absolute value of the negative focal length of the intermediate lens group $L_m$ becomes larger so that the ratio exceeds the upper limit, an effective diameter of a front lens is disadvantageously increased.

The conditional expression (7) defines a relationship between the focal lengths of the (n−1)th lens unit $L_{n-1}$ and the n-th lens unit $L_n$. A light flux dispersed by the intermediate lens group $L_m$ is converged by the (n−1)th lens unit $L_{n-1}$ to enter the n-th lens unit $L_n$ in a state close to parallel rays at the telephoto end, to thereby facilitate appropriate correction of an aberration variation during zooming.

The conditional expression (7) is intended to appropriately set a relationship between the focal length of the (n−1)th lens unit $L_{n-1}$ and the focal length of the n-th lens unit $L_n$. When the focal length of the (n−1)th lens unit $L_{n-1}$ becomes longer and the focal length of the n-th lens unit $L_n$ becomes shorter so that the ratio exceeds the upper limit of the conditional expression (7), the light flux dispersed by the intermediate lens group $L_m$ is not sufficiently converged by the (n−1)th lens unit $L_{n-1}$ at the telephoto end to enter the n-th lens unit $L_n$ in a state of being dispersed. Then, the aberration variation is disadvantageously increased during zooming. On the other hand, when the focal length of the (n−1)th lens unit $L_{n-1}$ becomes shorter and the focal length of the n-th lens unit $L_n$ becomes longer so that the ratio falls below the lower limit, it becomes disadvantageously difficult to correct spherical aberration at the telephoto end.

The conditional expression (8) defines a relationship between the focal length of the intermediate lens group $L_m$ and the focal length of the zoom lens at the wide angle end. When the absolute value of the negative focal length of the intermediate lens group $L_m$ becomes larger so that the ratio falls below the lower limit of the conditional expression (8), a movement amount required for magnification varying is increased, and the entire system of the zoom lens is disadvantageously increased in size. On the other hand, when the absolute value of the negative focal length of the intermediate lens group $L_m$ becomes smaller so that the ratio exceeds the upper limit, spherical aberration and astigmatism are increased at the telephoto end, and it becomes disadvantageously difficult to correct those various aberrations.

The conditional expression (9) defines a relationship between the focal length of the n-th lens unit $L_n$ and the focal length of the entire system of the zoom lens at the wide angle end. When the focal length of the n-th lens unit $L_n$ becomes longer so that the ratio exceeds the upper limit of the conditional expression (9), it becomes disadvantageously difficult to secure a sufficient length of the back focus at the wide angle end. On the other hand, when the focal length of the n-th lens unit $L_n$ becomes shorter so that the ratio falls below the lower limit, it becomes disadvantageously difficult to correct distortion at the wide angle end.

The conditional expression (10) defines a combined lateral magnification of the intermediate lens group $L_m$ at the telephoto end. When an absolute value of the combined lateral magnification becomes smaller so that the combined lateral magnification exceeds the upper limit of the conditional expression (10), it becomes disadvantageously difficult to achieve the high zoom ratio. On the other hand, when the absolute value of the combined lateral magnification becomes larger so that the combined lateral magnification falls below the lower limit, movement amounts of the first lens unit L1 and the intermediate lens group $L_m$ accompanying magnification varying are increased, and the entire system of the zoom lens is disadvantageously increased in size. It is more preferred to set the numerical value ranges of the conditional expressions (4) to (10) to the following ranges.

$$1.6 < f_n \times \Sigma \Phi LPL < 3.2 \tag{4a}$$

$$0.35 < fn \times \Phi LPH < 1.30 \tag{5a}$$

$$-7.0 < f1/f_m < -5.3 \tag{6a}$$

$$1.05 < f_{n-1}/f_n < 1.65 \tag{7a}$$

$$-0.75 < f_m/f_w < -0.60 \tag{8a}$$

$$1.35 < f_n/f_w < 1.70 \tag{9a}$$

$$-0.48 < \beta mt < -0.28 \tag{10a}$$

In the Example, the intermediate lens group $L_m$ serves as a main magnification-varying lens unit. It is preferred for the intermediate lens group $L_m$ including the at least one lens unit to have a negative refractive power as a whole over the entire zoom range. It is preferred for the intermediate lens group $L_m$ to consist of one or two lens units, and when the intermediate lens group includes two lens units, it is preferred for each of the two lens units to have a negative refractive power. Moreover, when the intermediate lens group $L_m$ includes two lens units, it is preferred to perform zooming such that an interval between the two lens units is smaller at the telephoto end than at the wide angle end.

In the zoom lens according to each of Examples of the present invention, it is preferred to perform focusing with a lens system forming the entirety or a part of any one of the lens units arranged on the image side of the first lens unit L1. In particular, it is preferred to extend any one of the lens units that form the intermediate lens group $L_m$ toward the object side during focusing from infinity to proximity.

The intermediate lens group $L_m$ is the main magnification-varying lens unit and has the strong refractive power, and hence an extraction amount required during focusing can be reduced, and it becomes easy to downsize the entire system of the zoom lens. Moreover, through focusing with any one of the lens units that form the intermediate lens group $L_m$, a weight of a focus lens system can be reduced. Further, a mechanism for driving focusing can be simplified, and hence it becomes easy to downsize the entire system of the zoom lens.

Next, zoom lenses according to Examples are described.

Figure 2A:
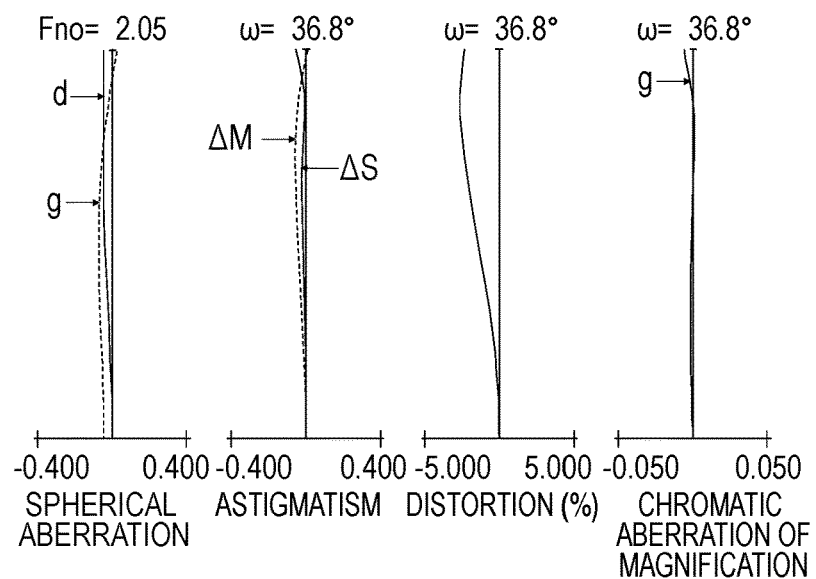
FIG. 2A is an aberration diagram in Example 1 when focused at infinity at the wide angle end.
Figure 2B:
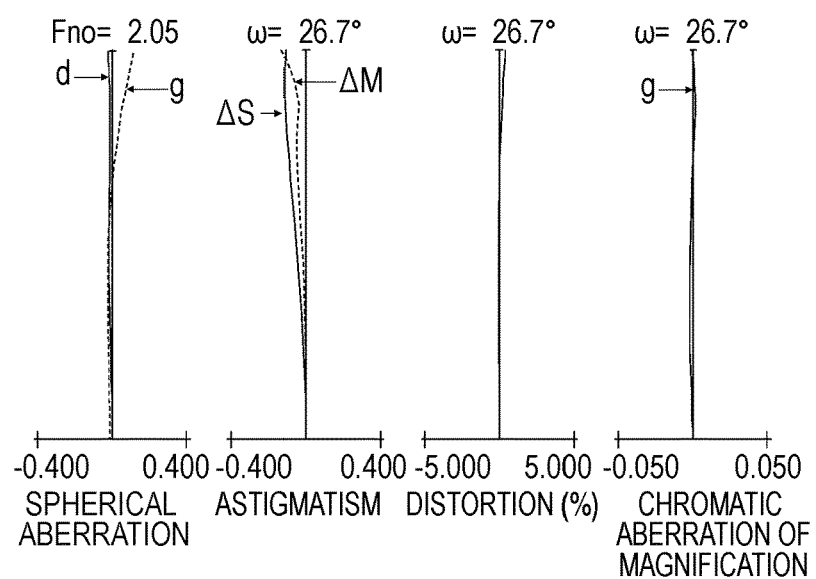
FIG. 2B is an aberration diagram in Example 1 when focused at infinity at an intermediate zoom position.
Figure 2C:
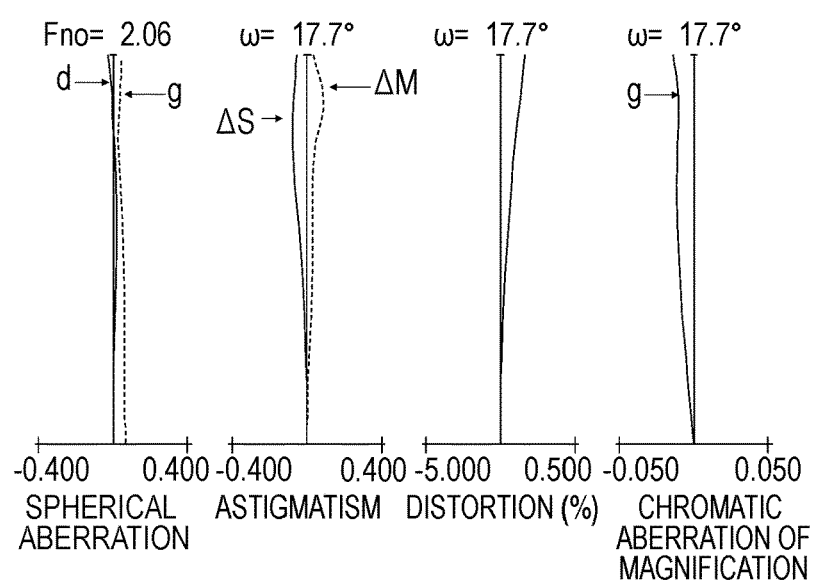
FIG. 2C is an aberration diagram in Example 1 when focused at infinity at a telephoto end.

FIG. 1 is a lens cross-sectional view of a zoom lens according to Example 1 of the present invention at a wide angle end. FIG. 2A, FIG. 2B, and FIG. 2C are aberration diagrams of the zoom lens according to Example 1 at the wide angle end, an intermediate zoom position, and a telephoto end, respectively. Example 1 relates to a zoom lens having a zoom ratio of 2.35 and an f-number of from about 2.05 to about 2.06.

Figure 3:
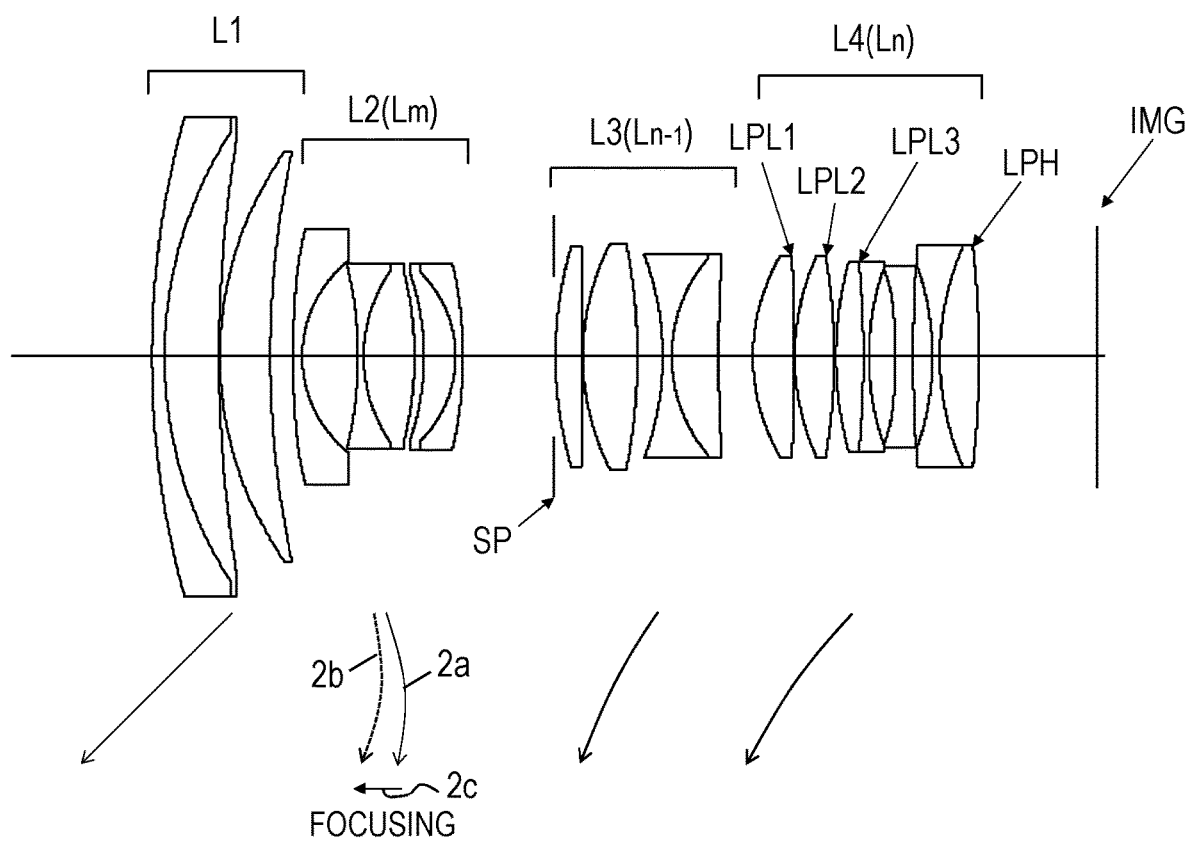
FIG. 3 is a lens cross-sectional view in Example 2 of the present invention at a wide angle end.
Figure 4A:
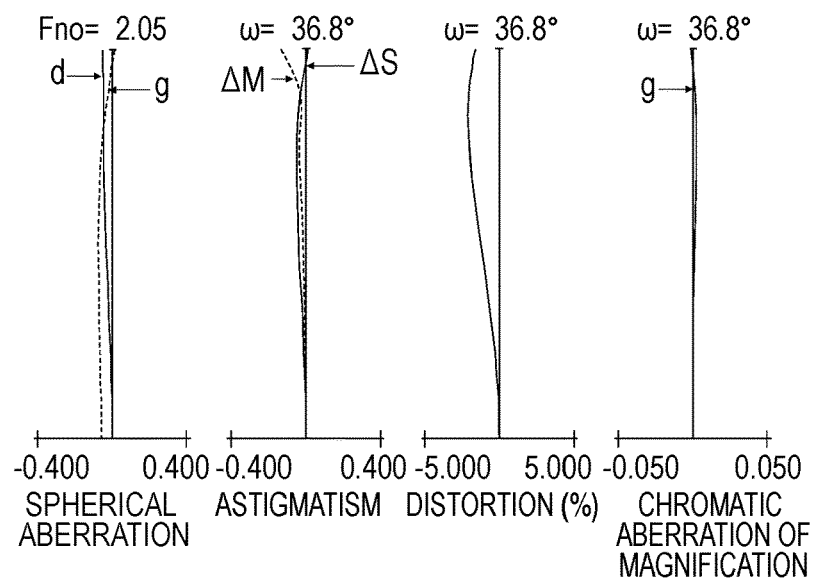
FIG. 4A is an aberration diagram in Example 2 when focused at infinity at the wide angle end.
Figure 4B:
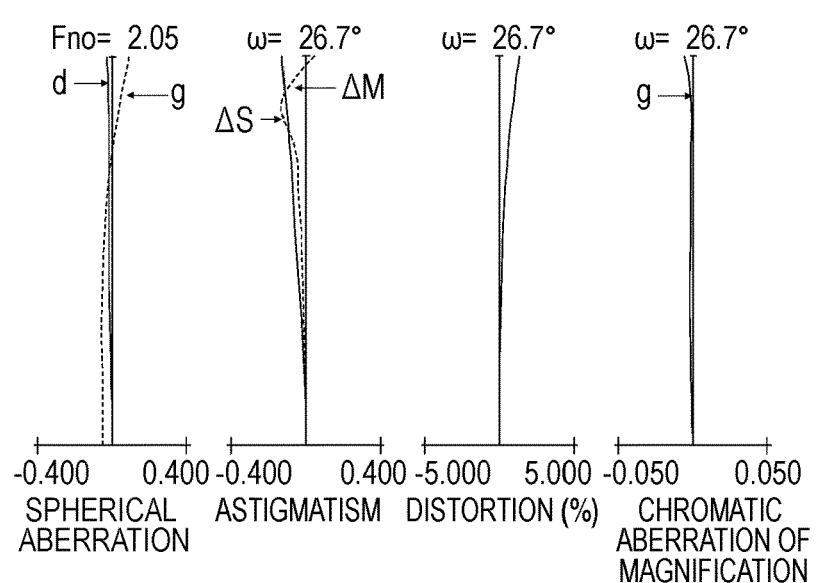
FIG. 4B is an aberration diagram in Example 2 when focused at infinity at an intermediate zoom position.
Figure 4C:
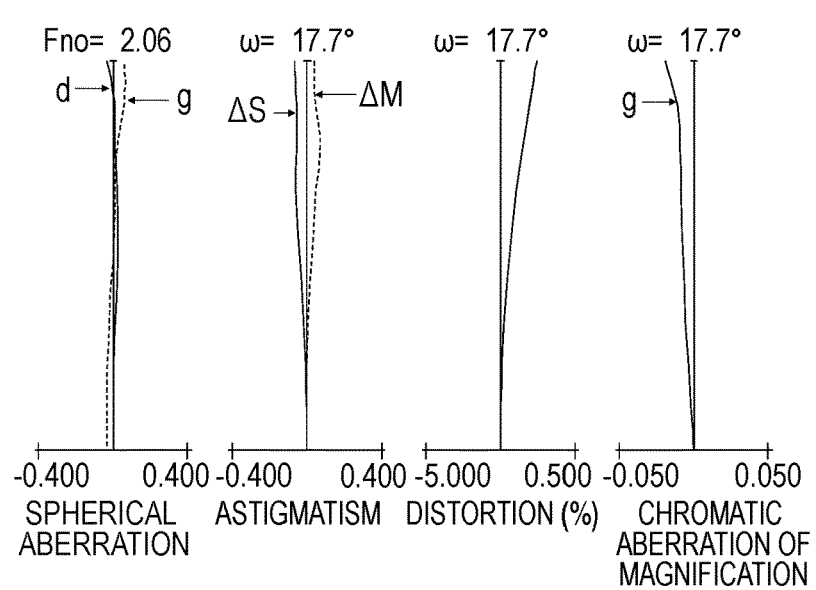
FIG. 4C is an aberration diagram in Example 2 when focused at infinity at a telephoto end.

FIG. 3 is a lens cross-sectional view of a zoom lens according to Example 2 of the present invention at a wide angle end. FIG. 4A, FIG. 4B, and FIG. 4C are aberration diagrams of the zoom lens according to Example 2 at the wide angle end, an intermediate zoom position, and a telephoto end, respectively. Example 2 relates to a zoom lens having a zoom ratio of 2.35 and an f-number of from about 2.05 to about 2.06.

Figure 5:
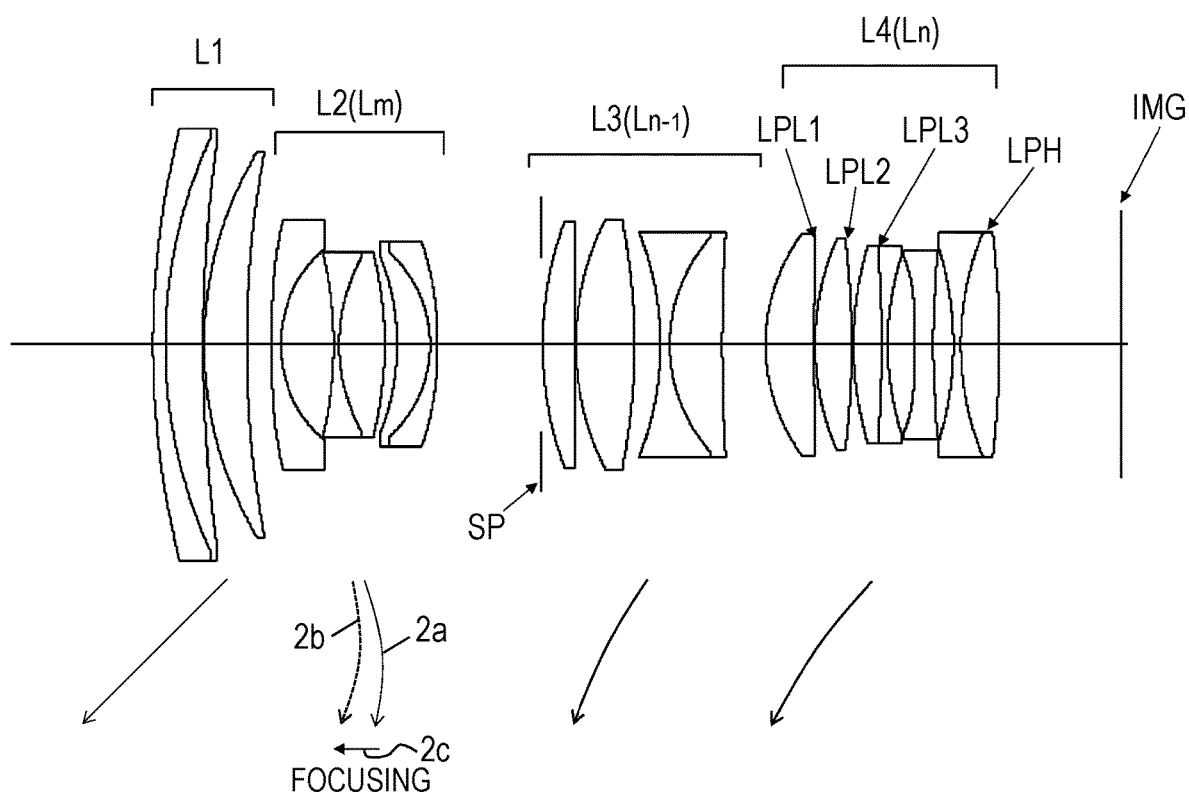
FIG. 5 is a lens cross-sectional view in Example 3 of the present invention at a wide angle end.
Figure 6A:
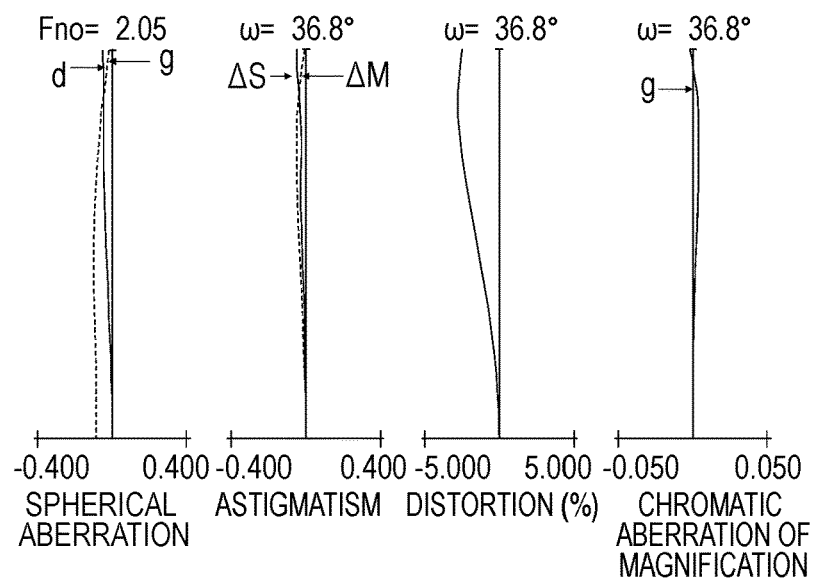
FIG. 6A is an aberration diagram in Example 3 when focused at infinity at the wide angle end.
Figure 6B:
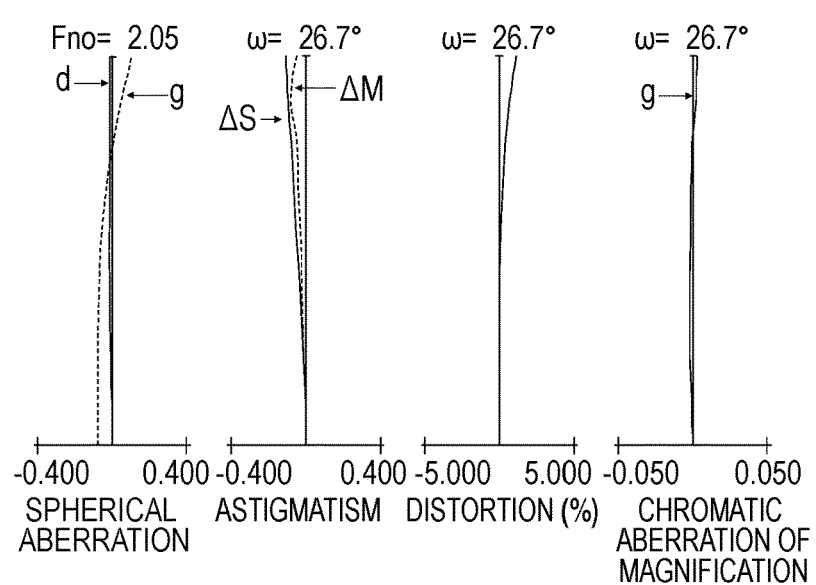
FIG. 6B is an aberration diagram in Example 3 when focused at infinity at an intermediate zoom position.
Figure 6C:
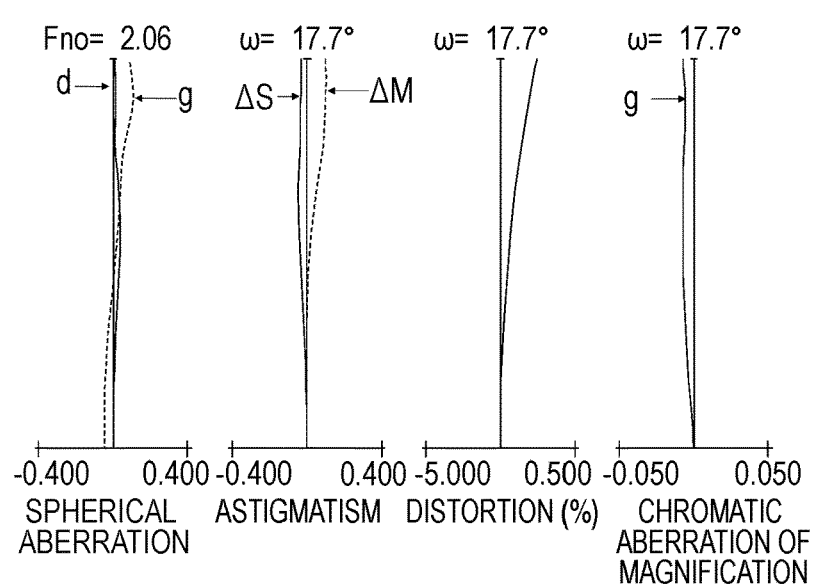
FIG. 6C is an aberration diagram in Example 3 when focused at infinity at a telephoto end.

FIG. 5 is a lens cross-sectional view of a zoom lens according to Example 3 of the present invention at a wide angle end. FIG. 6A, FIG. 6B, and FIG. 6C are aberration diagrams of the zoom lens according to Example 3 at the wide angle end, an intermediate zoom position, and a telephoto end, respectively. Example 3 relates to a zoom lens having a zoom ratio of 2.35 and an f-number of from about 2.05 to about 2.06.

Figure 7:
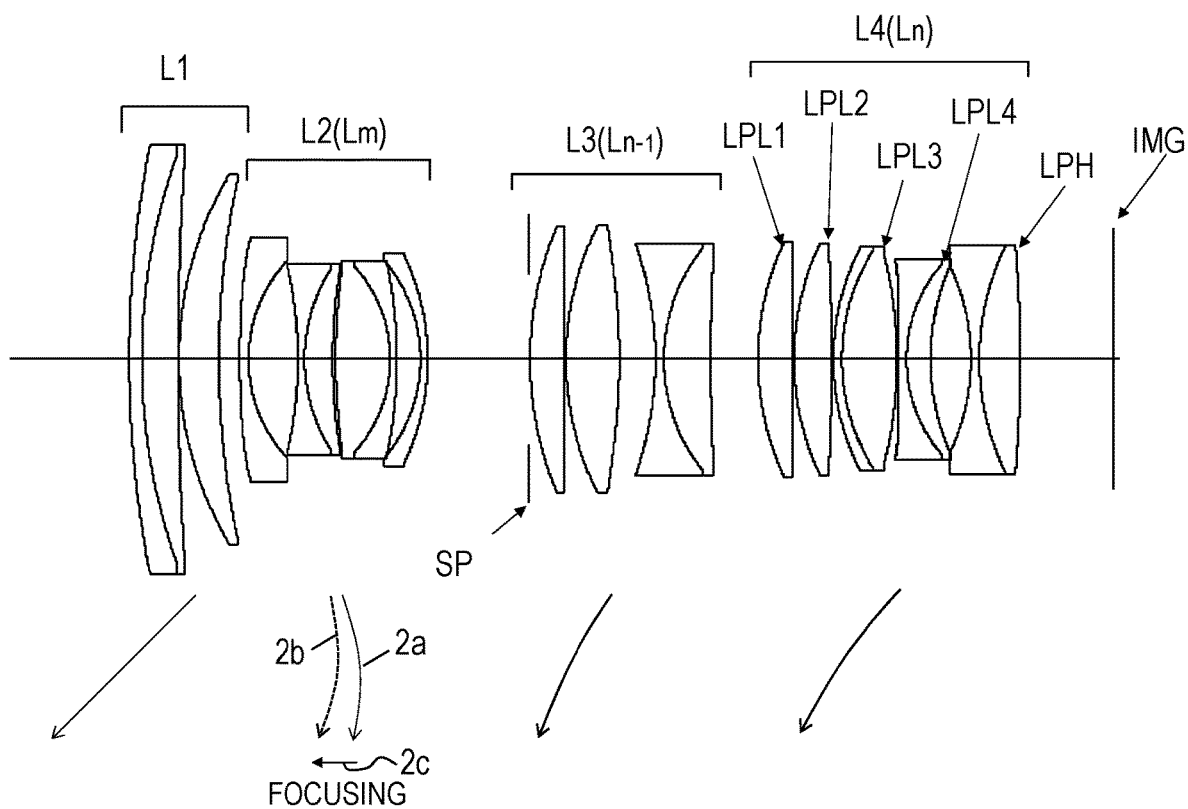
FIG. 7 is a lens cross-sectional view in Example 4 of the present invention at a wide angle end.
Figure 8A:
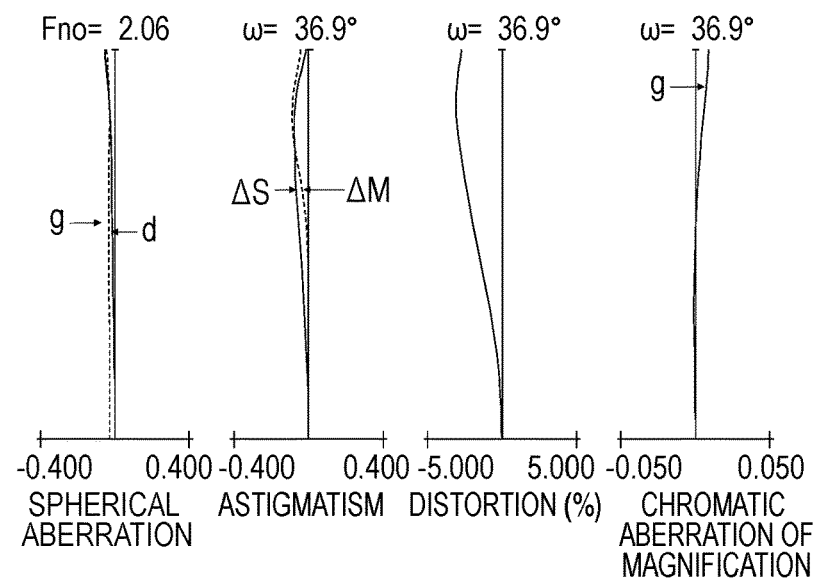
FIG. 8A is an aberration diagram in Example 4 when focused at infinity at the wide angle end.
Figure 8B:
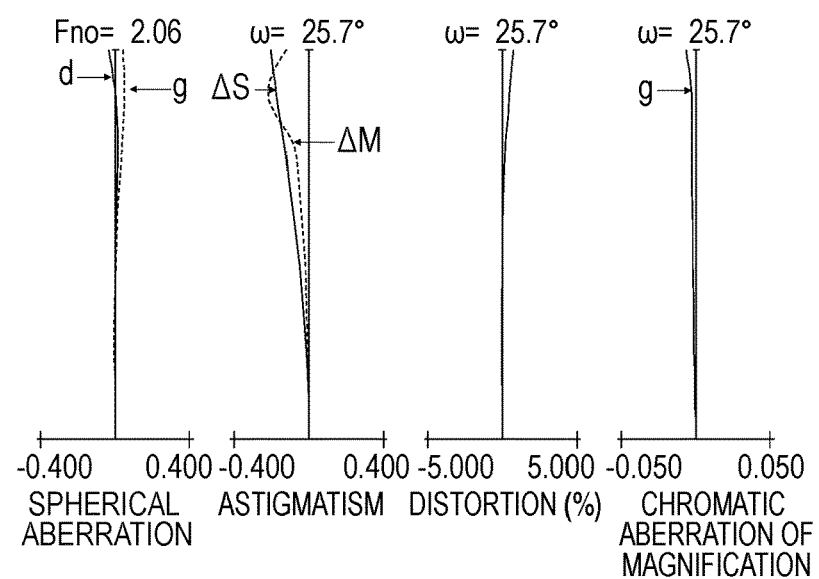
FIG. 8B is an aberration diagram in Example 4 when focused at infinity at an intermediate zoom position.
Figure 8C:
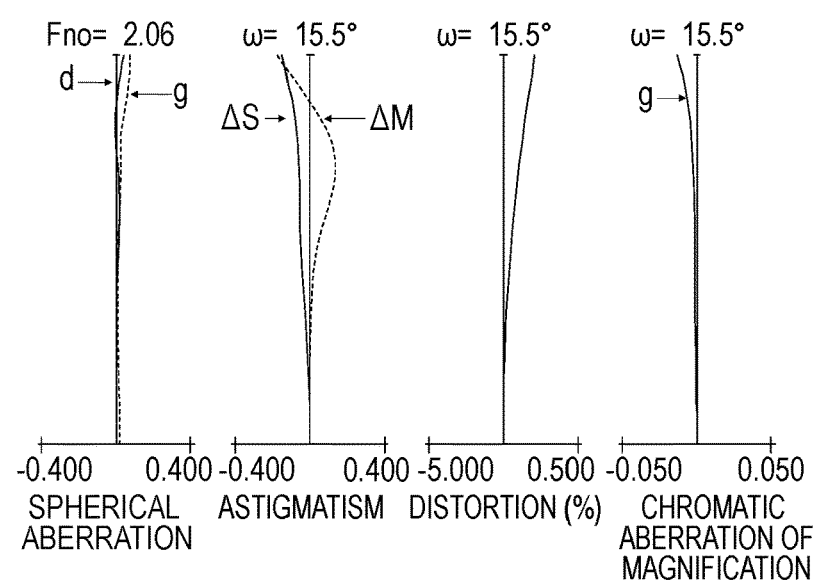
FIG. 8C is an aberration diagram in Example 4 when focused at infinity at a telephoto end.

FIG. 7 is a lens cross-sectional view of a zoom lens according to Example 4 of the present invention at a wide angle end. FIG. 8A, FIG. 8B, and FIG. 8C are aberration diagrams of the zoom lens according to Example 4 at the wide angle end, an intermediate zoom position, and a telephoto end, respectively. Example 4 relates to a zoom lens having a zoom ratio of 2.70 and an f-number of about 2.06.

The plurality of lens units included in the zoom lens according to each of Examples 1 to 4 consist of, in order from the object side to the image side, a first lens unit L1 having a positive refractive power, a second lens unit L2 having a negative refractive power, a third lens unit L3 having a positive refractive power, and a fourth lens unit L4 having a positive refractive power. In Examples 1 to 4, the second lens unit L2 corresponds to the intermediate lens group $L_m$, the third lens unit L3 corresponds to the above-mentioned (n−1)th lens unit $L_{n-1}$, and the fourth lens unit L4 corresponds to the above-mentioned n-th lens unit $L_n$.

All the lens units are configured to move during zooming. Moreover, zooming is performed such that an interval between the first lens unit L1 and the second lens unit L2 is larger, an interval between the second lens unit L2 and the third lens unit L3 is smaller, and an interval between the third lens unit L3 and the fourth lens unit L4 is smaller at the telephoto end than at the wide angle end.

In each of Examples 1 to 4, the second lens unit L2 is configured to move on the optical axis to perform focusing. During focusing from infinity to proximity, the second lens unit L2 is extended to the object side as indicated by an arrow 2c. A solid line 2a indicates a movement locus for correcting an image plane variation during zooming from the wide angle end to the telephoto end when the focus is on an object at infinity. A dotted line 2b indicates a movement locus for correcting the image plane variation during zooming from the wide angle end to the telephoto end when the focus is on an object at proximity.

Figure 9:
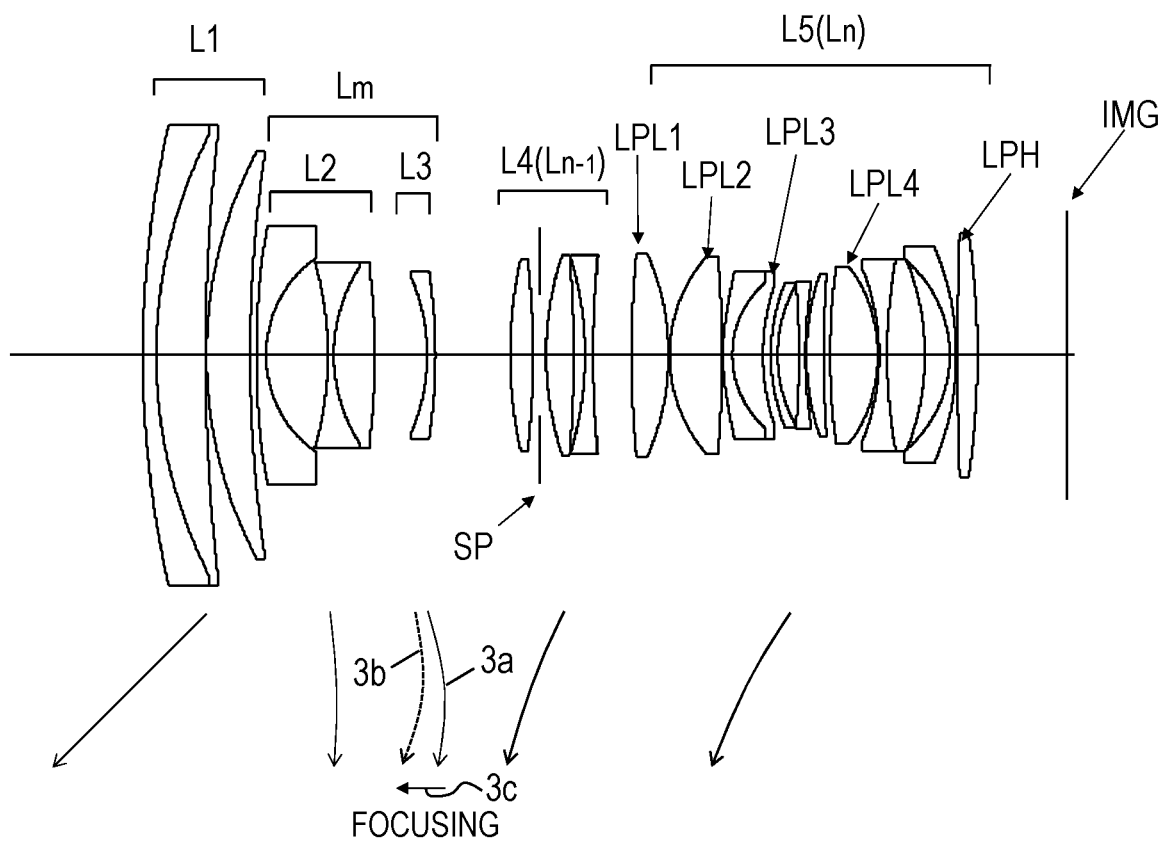
FIG. 9 is a lens cross-sectional view in Example 5 of the present invention at a wide angle end.
Figure 10A:
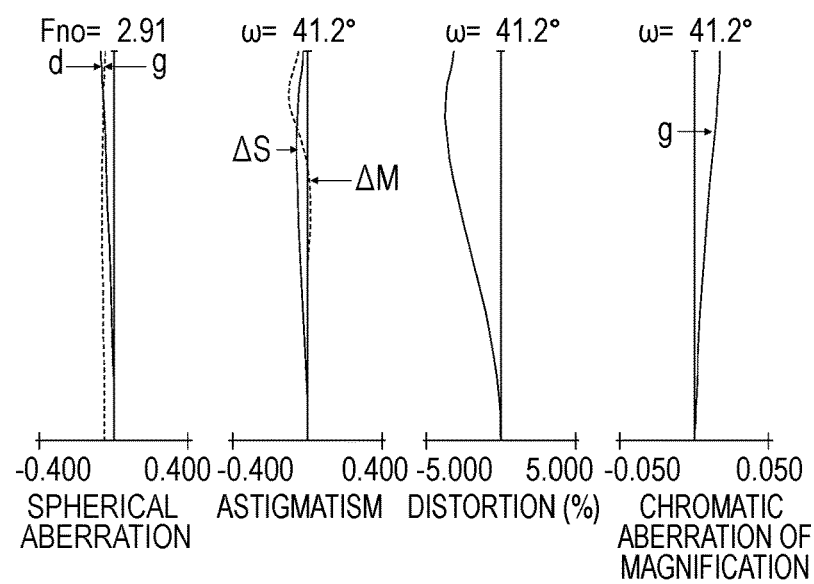
FIG. 10A is an aberration diagram in Example 5 when focused at infinity at the wide angle end.
Figure 10B:
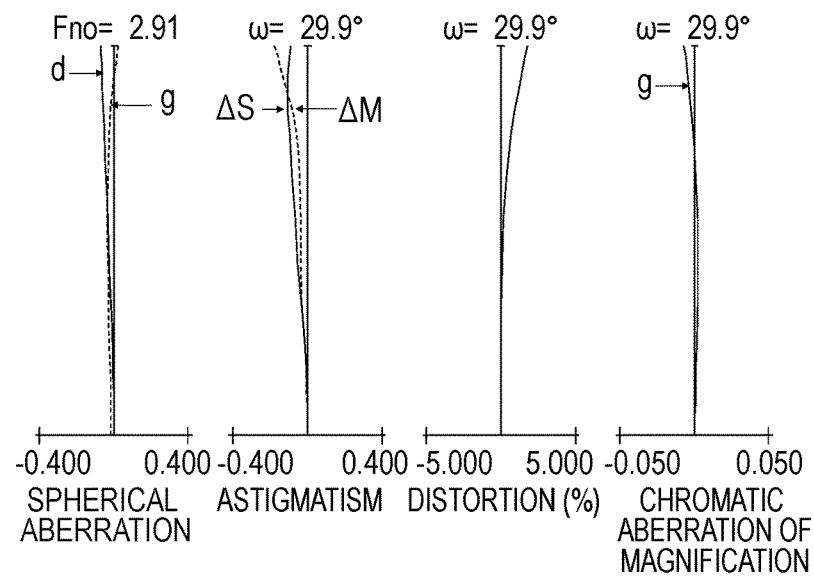
FIG. 10B is an aberration diagram in Example 5 when focused at infinity at an intermediate zoom position.
Figure 10C:
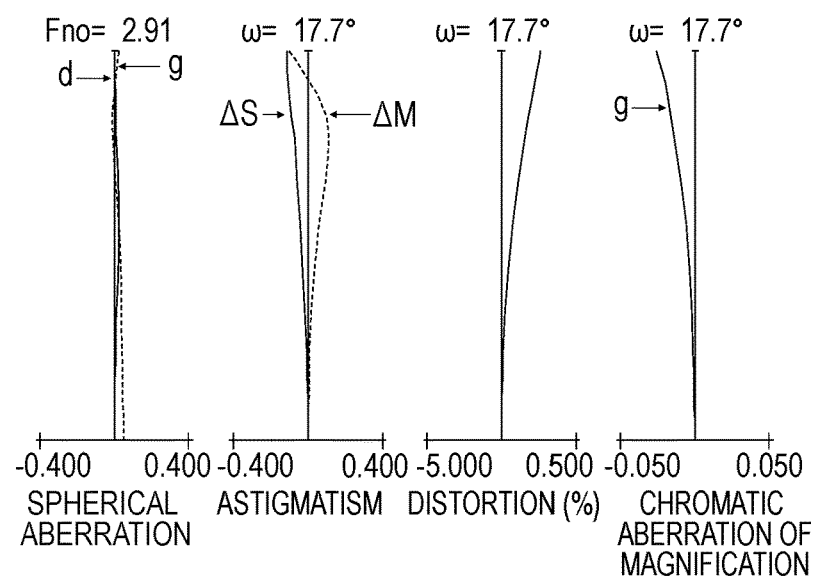
FIG. 10C is an aberration diagram in Example 5 when focused at infinity at a telephoto end.

FIG. 9 is a lens cross-sectional view of a zoom lens according to Example 5 of the present invention at a wide angle end. FIG. 10A, FIG. 10B, and FIG. 10C are aberration diagrams of the zoom lens according to Example 5 at the wide angle end, an intermediate zoom position, and a telephoto end, respectively. Example 5 relates to a zoom lens having a zoom ratio of 2.75 and an f-number of about 2.91.

The plurality of lens units included in the zoom lens according to Example 5 consist of, in order from the object side to the image side, a first lens unit L1 having a positive refractive power, a second lens unit L2 having a negative refractive power, a third lens unit L3 having a negative refractive power, a fourth lens unit L4 having a positive refractive power, and a fifth lens unit L5 having a positive refractive power. In Example 5, the second lens unit L2 and the third lens unit L3 correspond to the intermediate lens group $L_m$, the fourth lens unit L4 corresponds to the above-mentioned (n−1)th lens unit $L_{n-1}$, and the fifth lens unit L5 corresponds to the above-mentioned n-th lens unit $L_n$.

All the lens units are configured to move during zooming. Moreover, zooming is performed such that an interval between the first lens unit L1 and the second lens unit L2 is larger, an interval between the second lens unit L2 and the third lens unit L3 is smaller, an interval between the third lens unit L3 and the fourth lens unit L4 is smaller, and an interval between the fourth lens unit L4 and the fifth lens unit L5 is smaller at the telephoto end than at the wide angle end.

In Example 5, the third lens unit L3 is configured to move on the optical axis to perform focusing. During focusing from infinity to proximity, the third lens unit L3 is extended to the object side as indicated by an arrow 3c. A solid line 3a indicates a movement locus for correcting an image plane variation during zooming from the wide angle end to the telephoto end when the focus is on an object at infinity. A dotted line 3b indicates a movement locus for correcting the image plane variation during zooming from the wide angle end to the telephoto end when the focus is on an object at proximity.

In the zoom lens according to each of Examples, a lens system forming the entirety or a part of the lens units arranged on the image side of the first lens unit L1 may be driven in a direction having a component in a direction perpendicular to the optical axis direction to correct image blur due to camera shake. It is particularly preferred to use a lens system of the n-th lens unit $L_n$ as a lens system for image blur correction. With this configuration, the lens system for image blur correction has a small lens diameter, and hence it becomes easy to downsize the zoom lens.

Figure 12:
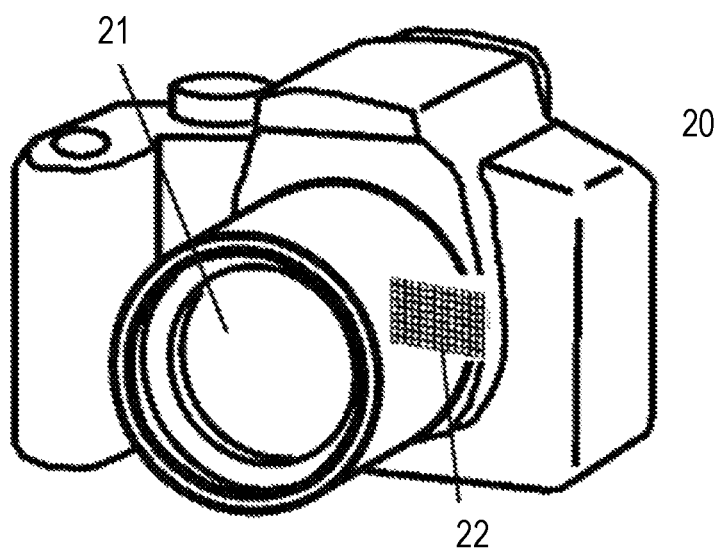
FIG. 12 is a schematic view of a main part of an image pickup apparatus according to one embodiment of the present invention.

Next, an image pickup apparatus according to one embodiment of the present invention, which is illustrated in FIG. 12, is described. The image pickup apparatus includes a camera main body 20, and any one of the zoom lenses described in Examples 1 to 5 serving as a photographing optical system. A solid-state image pickup element 22 is a CCD sensor, a CMOS sensor, or other such element, which is included in the camera main body to receive an object image formed by a photographing optical system 21. The zoom lens according to each of Examples is also applicable to a single lens reflex camera with a quick return mirror or a mirrorless camera without a quick return mirror.

The zoom lenses according to exemplary Examples of the present invention have been described above. However, it should be understood that the present invention is not limited to the above-mentioned Examples, and various alterations and modifications can be made thereto within the gist of the invention.

For example, the intermediate lens group $L_m$ may consist of three or more lens units including a lens unit having a negative refractive power. For example, the present invention is not limited to the case in which the aperture stop SP is configured to move along with a lens unit during zooming, and the aperture stop SP may be configured to move independently.

Numerical Data 1 to 5 corresponding to Examples 1 to 5 are shown below. In each of Numerical Data, symbol i represents the order of surfaces from the object side. In each of Numerical Data, symbol "ri" represents a curvature radius of the i-th lens surface counted from the object side, symbol "di" represents a lens thickness or an air interval between the i-th lens surface and an (i+1)th lens surface counted from the object side, and symbols "ndi" and "vdi" represent a refractive index and an Abbe number of a material between the i-th lens surface and the (i+1)th lens surface counted from the object side, respectively. Symbol BF represents the back focus. When an X axis is set in the optical axis direction, an H axis is set in a direction perpendicular to the optical axis, a traveling direction of light is defined as positive, a paraxial curvature radius is represented by R, and aspherical coefficients are represented by K, A2, A4, A6, A8, A10, and A12, an aspherical shape is given by the following equation.

$$X = \frac{(1/R)}{1 + \sqrt{1 - (1+K)(H/R)^2}} + A_2H^2 + A_4H^4 + A_6H^6 + A_8H^8 + A_{10}H^{10} + A_{12}H^{12}$$

In each of the aspherical coefficients, "e-x" means "$10^{-x}$". In addition to specifications such as the focal lengths and the f-number, there are shown a half angle of view of the entire system of the zoom lens, an image height, which is the maximum image height that determines the half angle of view, and the total length of the zoom lens, which is a distance from the first lens surface to the image plane. Back focus BF indicates a length from the last lens surface to the image plane. Moreover, data on the respective lens units indicates focal lengths of the respective lens units.

In addition, the part in which an interval d of each optical surface is "(variable)" is changed during zooming, and an interval between surfaces corresponding to the focal length is shown in an annexed table. Results of calculations of the conditional expressions based on lens data in Numerical Data 1 to 5 described below are shown in Table 1.

[Numerical Data 1]

Surface data

| Surface number | r | d | nd | vd |
|---|---|---|---|---|
| 1 | 153.129 | 2.10 | 1.80810 | 22.8 |
| 2 | 68.126 | 9.20 | 1.72916 | 54.7 |
| 3 | 229.651 | 0.15 | | |
| 4 | 56.538 | 8.42 | 1.77250 | 49.6 |
| 5 | 143.922 | (Variable) | | |
| 6* | 177.309 | 1.50 | 1.85135 | 40.1 |
| 7 | 21.050 | 9.92 | | |
| 8 | −48.645 | 0.90 | 1.76385 | 48.5 |
| 9 | 25.647 | 8.34 | 1.85478 | 24.8 |
| 10 | −50.942 | 2.34 | | |
| 11 | −31.481 | 5.59 | 1.51742 | 52.4 |
| 12 | −18.463 | 1.20 | 1.88300 | 40.8 |
| 13* | −44.498 | (Variable) | | |
| 14 (Stop) | ∞ | 0.30 | | |
| 15 | 65.756 | 4.12 | 1.72916 | 54.7 |
| 16 | 371.024 | 0.15 | | |
| 17 | 45.665 | 9.76 | 1.80400 | 46.6 |
| 18* | −76.624 | 3.63 | | |
| 19 | −51.901 | 1.50 | 1.73800 | 32.3 |
| 20 | 27.845 | 8.48 | 1.49700 | 81.5 |
| 21 | 510.252 | (Variable) | | |
| 22 | 39.711 | 7.32 | 1.43875 | 94.7 |
| 23 | −174.360 | 0.15 | | |
| 24 | 37.228 | 7.09 | 1.59522 | 67.7 |
| 25 | −104.496 | 0.30 | | |
| 26 | 87.786 | 1.10 | 1.69895 | 30.1 |
| 27 | 31.012 | 5.54 | | |
| 28* | −1000.000 | 2.00 | 1.85400 | 40.4 |
| 29* | 55.807 | 1.31 | | |
| 30 | 57.476 | 1.20 | 1.48749 | 70.2 |
| 31 | 35.136 | 5.66 | 1.85025 | 30.1 |
| 32 | 172.397 | (Variable) | | |
| Image plane | ∞ | | | |

Aspherical surface data

Sixth surface

K = 0.00000e+000  A4 = 5.10348e−006  A6 = −4.34457e−009
A8 = 1.37999e−011  A10 = −2.48862e−014  A12 = 2.63278e−017

Thirteenth surface

K = 0.00000e+000  A4 = −1.62945e−006  A6 = −1.93301e−009
A8 = −6.21737e−012  A10 = 2.66590e−014  A12 = −4.35899e−017

Eighteenth surface

K = 0.00000e+000  A4 = 2.55792e−006  A6 = −1.69292e−009
A8 = −2.27540e−012  A10 = 4.02496e−015  A12 = −2.17151e−018

Twenty-eighth surface

K = 0.00000e+000  A4 = −4.41081e−005  A6 = 1.28044e−007
A8 = −2.10057e−010  A10 = −1.84393e−013  A12 = 8.43712e−016

Twenty-ninth surface

K = 0.00000e+000  A4 = −3.09220e−005  A6 = 1.56402e−007
A8 = −2.84790e−010  A10 = 1.76646e−013  A12 = 2.07899e−016

Various data
Zoom ratio 2.35

| | Wide angle | Intermediate | Telephoto |
|---|---|---|---|
| Focal length | 28.90 | 42.99 | 67.90 |
| F-number | 2.05 | 2.05 | 2.06 |
| Half angle of view (degrees) | 36.82 | 26.72 | 17.67 |
| Image height | 21.64 | 21.64 | 21.64 |
| Total length of zoom lens | 163.98 | 171.82 | 184.65 |
| BF | 27.79 | 35.08 | 42.63 |
| d5 | 4.20 | 15.98 | 29.54 |
| d13 | 16.62 | 8.94 | 2.27 |
| d21 | 6.11 | 2.56 | 0.95 |
| d32 | 27.79 | 35.08 | 42.63 |

Lens unit data

| Unit | First surface | Focal length |
|---|---|---|
| 1 | 1 | 105.64 |
| 2 | 6 | −19.62 |
| 3 | 14 | 53.91 |
| 4 | 22 | 48.64 |

[Numerical Data 2]

Surface data

| Surface number | r | d | nd | vd |
|---|---|---|---|---|
| 1 | 149.047 | 2.10 | 1.80810 | 22.8 |
| 2 | 68.781 | 8.93 | 1.72916 | 54.7 |
| 3 | 223.676 | 0.15 | | |
| 4 | 58.980 | 8.28 | 1.77250 | 49.6 |
| 5 | 159.657 | (Variable) | | |
| 6* | 176.499 | 1.50 | 1.76902 | 49.3 |
| 7 | 20.208 | 9.19 | | |
| 8 | −63.499 | 0.90 | 1.76385 | 48.5 |
| 9 | 24.792 | 8.37 | 1.85478 | 24.8 |
| 10 | −55.595 | 1.57 | | |
| 11 | −41.903 | 5.18 | 1.48749 | 70.2 |
| 12 | −19.594 | 1.20 | 1.88300 | 40.8 |
| 13* | −74.922 | (Variable) | | |
| 14 (Stop) | ∞ | 0.30 | | |
| 15 | 64.431 | 4.46 | 1.72916 | 54.7 |
| 16 | ∞ | 0.15 | | |
| 17 | 40.646 | 8.99 | 1.80400 | 46.6 |
| 18* | −88.160 | 4.14 | | |
| 19 | −47.780 | 1.50 | 1.73800 | 32.3 |
| 20 | 25.016 | 7.71 | 1.49700 | 81.5 |
| 21 | 248.460 | (Variable) | | |
| 22 | 33.078 | 6.71 | 1.43875 | 94.7 |
| 23 | −469.348 | 0.15 | | |
| 24 | 40.254 | 6.46 | 1.59522 | 67.7 |
| 25 | −101.746 | 0.30 | | |
| 26 | 59.526 | 4.51 | 1.49700 | 81.5 |
| 27 | −177.956 | 1.00 | 1.80610 | 33.3 |
| 28 | 44.079 | 4.23 | | |
| 29* | −1000.000 | 3.00 | 1.85400 | 40.4 |
| 30* | 109.178 | 3.26 | | |
| 31 | −45.198 | 1.20 | 1.48749 | 70.2 |
| 32 | 45.131 | 6.42 | 2.00100 | 29.1 |
| 33 | −169.151 | (Variable) | | |
| Image plane | ∞ | | | |

Aspherical surface data

Sixth surface

K = 0.00000e+000   A4 = 4.40628e−006   A6 = −2.80374e−009
A8 = 3.12113e−012   A10 = 2.43107e−015   A12 = −2.17038e−018

Thirteenth surface

K = 0.00000e+000   A4 = −2.36140e−006   A6 = −1.08356e−009
A8 = −1.99552e−011   A10 = 1.00829e−013   A12 = −1.77388e−016

Eighteenth surface

K = 0.00000e+000   A4 = 2.15576e−006   A6 = −2.33619e−009
A8 = −1.82040e−012   A10 = −1.99976e−016   A12 = 4.53234e−018

Twenty-ninth surface

K = 0.00000e+000   A4 = −4.82313e−005   A6 = 1.54634e−008
A8 = 3.00393e−010   A10 = −1.04531e−012   A12 = 1.51938e−015

Thirtieth surface

K = 0.00000e+000   A4 = −2.82244e−005   A6 = 5.87972e−008
A8 = 2.35247e−010   A10 = −8.07024e−013   A12 = 9.56680e−016

Various data
Zoom ratio 2.35

| | Wide angle | Intermediate | Telephoto |
|---|---|---|---|
| Focal length | 28.91 | 42.97 | 67.89 |
| F-number | 2.05 | 2.05 | 2.06 |
| Half angle of view (degrees) | 36.81 | 26.72 | 17.68 |
| Image height | 21.64 | 21.64 | 21.64 |
| Total length of zoom lens | 155.86 | 165.41 | 178.09 |
| BF | 19.57 | 25.90 | 33.38 |
| d5 | 3.86 | 16.61 | 29.64 |
| d13 | 14.92 | 8.44 | 2.27 |
| d21 | 5.66 | 2.61 | 0.95 |
| d33 | 19.57 | 25.90 | 33.38 |

Lens unit data

| Unit | First surface | Focal length |
|---|---|---|
| 1 | 1 | 105.82 |
| 2 | 6 | −18.96 |
| 3 | 14 | 48.62 |
| 4 | 22 | 41.98 |

[Numerical Data 3]

Surface data

| Surface number | r | d | nd | vd |
|---|---|---|---|---|
| 1 | 144.804 | 2.00 | 1.89286 | 20.4 |
| 2 | 80.643 | 6.11 | 1.59522 | 67.7 |
| 3 | 243.143 | 0.15 | | |
| 4 | 61.346 | 6.87 | 1.81600 | 46.6 |
| 5 | 171.031 | (Variable) | | |
| 6* | 203.092 | 1.50 | 1.76902 | 49.3 |
| 7* | 20.812 | 8.59 | | |
| 8 | −65.631 | 0.90 | 1.76385 | 48.5 |
| 9 | 29.254 | 7.34 | 1.85478 | 24.8 |
| 10 | −61.569 | 2.03 | | |
| 11 | −38.415 | 5.32 | 1.51742 | 52.4 |
| 12 | −20.148 | 1.20 | 1.88300 | 40.8 |
| 13* | −59.537 | (Variable) | | |
| 14 (Stop) | ∞ | 0.30 | | |
| 15 | 57.714 | 5.26 | 1.77250 | 49.6 |
| 16 | ∞ | 0.15 | | |
| 17 | 44.429 | 9.55 | 1.76902 | 49.3 |
| 18* | −96.171 | 4.18 | | |
| 19 | −49.818 | 1.50 | 1.73800 | 32.3 |
| 20 | 26.242 | 8.47 | 1.49700 | 81.5 |
| 21 | 294.624 | (Variable) | | |
| 22 | 30.340 | 7.83 | 1.43875 | 94.7 |
| 23 | 1266.545 | 0.15 | | |
| 24 | 43.310 | 5.92 | 1.59522 | 67.7 |
| 25 | −139.116 | 0.29 | | |
| 26 | 57.009 | 4.62 | 1.49700 | 81.5 |
| 27 | −215.536 | 1.00 | 1.80610 | 33.3 |
| 28 | 47.888 | 4.31 | | |
| 29* | −1000.000 | 3.00 | 1.85400 | 40.4 |
| 30* | 82.837 | 3.28 | | |
| 31 | −52.834 | 1.20 | 1.48749 | 70.2 |
| 32 | 47.839 | 6.17 | 2.00100 | 29.1 |
| 33 | −164.151 | (Variable) | | |
| Image plane | ∞ | | | |

Aspherical surface data

Sixth surface

K = 0.00000e+000   A4 = 5.87094e−006   A6 = −6.60397e−009
A8 = 2.25046e−011   A10 = −3.32596e−014   A12 = 1.93933e−017

Seventh surface

K = 0.00000e+000   A4 = 1.55362e−006   A6 = 3.84593e−009
A8 = −1.18365e−011   A10 = 2.50498e−013

Thirteenth surface

K = 0.00000e+000   A4 = −1.96403e−006   A6 = −2.41300e−009
A8 = −1.05968e−011   A10 = 4.08307e−014   A12 = −7.53278e−017

Eighteenth surface

K = 0.00000e+000   A4 = 1.68146e−006   A6 = −2.03638e−009
A8 = −2.58497e−012   A10 = 4.10802e−015   A12 = −1.63495e−018

Twenty-ninth surface

K = 0.00000e+000   A4 = −5.15686e−005   A6 = 4.02377e−008
A8 = 2.55176e−010   A10 = −9.82081e−013   A12 = 1.19282e−015

-continued

Thirtieth surface

K = 0.00000e+000  A4 = −3.22839e−005  A6 = 8.43469e−008
A8 = 1.67857e−010  A10 = −7.61031e−013  A12 = 9.20995e−016

Various data
Zoom ratio 2.35

|  | Wide angle | Intermediate | Telephoto |
| --- | --- | --- | --- |
| Focal length | 28.90 | 43.10 | 67.90 |
| F-number | 2.05 | 2.05 | 2.06 |
| Half angle of view (degrees) | 36.82 | 26.66 | 17.67 |
| Image height | 21.64 | 21.64 | 21.64 |
| Total length of zoom lens | 156.50 | 165.83 | 179.71 |
| BF | 19.59 | 27.33 | 36.75 |
| d5 | 4.05 | 17.08 | 30.55 |
| d13 | 16.65 | 8.99 | 2.27 |
| d21 | 7.02 | 3.24 | 0.95 |
| d33 | 19.59 | 27.33 | 36.75 |

Lens unit data

| Unit | First surface | Focal length |
| --- | --- | --- |
| 1 | 1 | 114.66 |
| 2 | 6 | −20.50 |
| 3 | 14 | 49.42 |
| 4 | 22 | 45.40 |

[Numerical Data 4]

Surface data

| Surface number | r | d | nd | vd |
| --- | --- | --- | --- | --- |
| 1 | 185.690 | 2.10 | 1.89286 | 20.4 |
| 2 | 102.616 | 5.96 | 1.59522 | 67.7 |
| 3 | 506.983 | 0.15 | | |
| 4 | 60.547 | 6.61 | 1.76385 | 48.5 |
| 5 | 145.490 | (Variable) | | |
| 6* | 196.972 | 1.40 | 1.88300 | 40.8 |
| 7 | 23.897 | 8.29 | | |
| 8 | −66.605 | 1.10 | 1.59282 | 68.6 |
| 9 | 27.915 | 4.65 | 1.90366 | 31.3 |
| 10 | 94.203 | 0.50 | | |
| 11 | 115.549 | 8.99 | 1.72825 | 28.5 |
| 12 | −23.106 | 1.10 | 1.88300 | 40.8 |
| 13 | −77.496 | 3.91 | | |
| 14 | −25.285 | 1.20 | 1.95375 | 32.3 |
| 15 | −39.935 | (Variable) | | |
| 16 (Stop) | ∞ | 0.30 | | |
| 17 | 57.217 | 5.76 | 1.80400 | 46.6 |
| 18 | −14821.675 | 0.15 | | |
| 19* | 48.154 | 8.94 | 1.77250 | 49.5 |
| 20* | −101.713 | 5.94 | | |
| 21 | −56.728 | 1.40 | 1.85025 | 30.1 |
| 22 | 29.702 | 7.73 | 1.49700 | 81.5 |
| 23 | 318.842 | (Variable) | | |
| 24 | 46.088 | 5.77 | 1.49700 | 81.5 |
| 25 | −2453.348 | 0.15 | | |
| 26 | 44.616 | 6.25 | 1.59522 | 67.7 |
| 27 | −342.571 | 0.25 | | |
| 28 | 40.473 | 1.40 | 2.00100 | 29.1 |
| 29 | 33.629 | 9.25 | 1.49700 | 81.5 |
| 30 | −70.003 | 0.15 | | |
| 31* | 180.669 | 1.40 | 1.85400 | 40.8 |
| 32 | 24.228 | 3.96 | 1.48749 | 70.2 |
| 33 | 38.371 | 6.68 | | |
| 34 | −35.992 | 1.40 | 1.59522 | 67.7 |
| 35 | 42.748 | 6.75 | 2.00069 | 25.5 |
| 36 | −218.385 | (Variable) | | |
| Image plane | ∞ | | | |

Aspherical surface data

Sixth surface

K = 0.00000e+000  A4 = 4.39158e−006  A6 = −9.82898e−010
A8 = 2.69004e−012  A10 = −1.15093e−015  A12 = 6.67612e−018

Twentieth surface

K = 0.00000e+000  A4 = 2.99070e−006  A6 = −2.29872e−009
A8 = −1.18958e−012  A10 = 3.78487e−015  A12 = −2.25763e−018

Thirty-first surface

K = 0.00000e+000  A4 = −1.47587e−005  A6 = −1.30088e−008
A8 = 2.79729e−011  A10 = −7.52442e−014  A12 = 1.40883e−016

Various data
Zoom ratio 2.70

|  | Wide angle | Intermediate | Telephoto |
| --- | --- | --- | --- |
| Focal length | 28.84 | 44.96 | 77.80 |
| F-number | 2.06 | 2.06 | 2.06 |
| Half angle of view (degrees) | 36.87 | 25.70 | 15.54 |
| Image height | 21.64 | 21.64 | 21.64 |
| Total length of zoom lens | 162.79 | 173.70 | 191.92 |
| BF | 15.28 | 23.29 | 33.80 |
| d5 | 3.47 | 18.39 | 35.68 |
| d15 | 16.63 | 8.99 | 1.85 |
| d23 | 7.83 | 3.44 | 1.00 |
| d36 | 15.28 | 23.29 | 33.80 |

Lens unit data

| Unit | First surface | Focal length |
| --- | --- | --- |
| 1 | 1 | 120.53 |
| 2 | 6 | −20.85 |
| 3 | 16 | 52.49 |
| 4 | 24 | 40.08 |

[Numerical Data 5]

Surface data

| Surface number | r | d | nd | vd |
| --- | --- | --- | --- | --- |
| 1 | 156.668 | 2.00 | 1.80810 | 22.8 |
| 2 | 73.194 | 7.44 | 1.72916 | 54.7 |
| 3 | 296.797 | 0.15 | | |
| 4 | 66.234 | 6.59 | 1.75500 | 52.3 |
| 5 | 210.185 | (Variable) | | |
| 6* | 186.430 | 1.40 | 1.85400 | 40.4 |
| 7* | 18.449 | 9.30 | | |
| 8 | −51.191 | 0.90 | 1.76385 | 48.5 |
| 9 | 24.866 | 6.16 | 2.00069 | 25.5 |
| 10 | −109.687 | (Variable) | | |
| 11* | −28.576 | 1.20 | 1.76902 | 49.3 |
| 12* | −79.826 | (Variable) | | |
| 13 | 66.184 | 3.43 | 1.69680 | 55.5 |
| 14 | −139.170 | 1.00 | | |
| 15 (Stop) | ∞ | 1.00 | | |
| 16 | 48.113 | 4.13 | 1.95375 | 32.3 |
| 17 | −206.077 | 1.74 | | |
| 18 | −50.948 | 1.20 | 2.00069 | 25.5 |
| 19 | 152.066 | (Variable) | | |

-continued

| | | | | |
|---|---|---|---|---|
| 20 | 165.603 | 5.57 | 1.43875 | 94.7 |
| 21 | −38.187 | 0.15 | | |
| 22 | 22.759 | 7.90 | 1.59522 | 67.7 |
| 23 | −189.209 | 0.15 | | |
| 24* | 36.645 | 1.40 | 1.88202 | 37.2 |
| 25 | 14.740 | 4.60 | 1.49700 | 81.5 |
| 26 | 32.873 | 1.21 | | |
| 27 | 29.026 | 1.00 | 1.88300 | 40.8 |
| 28 | 21.879 | 3.20 | | |
| 29 | −139.668 | 1.00 | 1.95375 | 32.3 |
| 30 | 69.840 | 0.15 | | |
| 31 | 38.242 | 2.58 | 1.80810 | 22.8 |
| 32 | 159.399 | 1.00 | | |
| 33* | 108.027 | 7.17 | 1.49710 | 81.6 |
| 34* | −24.165 | 0.20 | | |
| 35 | −34.666 | 1.20 | 2.00069 | 25.5 |
| 36 | 80.325 | 5.69 | 1.84666 | 23.8 |
| 37 | −38.384 | 3.75 | | |
| 38 | −18.705 | 1.00 | 1.77250 | 49.6 |
| 39 | −41.488 | 0.15 | | |
| 40 | 506.172 | 3.02 | 2.05090 | 26.9 |
| 41 | −127.955 | (Variable) | | |
| Image plane | ∞ | | | |

Aspherical surface data

Sixth surface

K = 0.00000e+000   A4 = 7.50660e−006   A6 = −2.36907e−008
A8 = 8.82428e−011  A10 = −1.73833e−013  A12 = 1.29082e−016

Seventh surface

K = 0.00000e+000   A4 = 3.52537e−006   A6 = −6.35320e−009
A8 = −8.56403e−012  A10 = 5.55051e−013

Eleventh surface

K = 0.00000e+000   A4 = 5.48818e−006   A6 = −9.39086e−009
A8 = −9.50083e−012  A10 = 2.81420e−013

Twelfth surface

K = 0.00000e+000   A4 = 5.86964e−006   A6 = −2.26952e−008
A8 = 4.62209e−011  A10 = 1.89723e−014

-continued

Twenty-fourth surface

K = 0.00000e+000   A4 = −1.65733e−005   A6 = −3.55878e−008
A8 = 4.00937e−011  A10 = −2.16945e−013  A12 = 5.66000e−016

Thirty-third surface

K = 0.00000e+000   A4 = −5.33034e−007   A6 = 2.61538e−008
A8 = −4.73509e−011  A10 = 7.83891e−014

Thirty-fourth surface

K = 0.00000e+000   A4 = −7.29151e−006   A6 = −3.35628e−009
A8 = −1.21899e−010  A10 = 9.39006e−014

Various data
Zoom ratio 2.75

| | Wide angle | Intermediate | Telephoto |
|---|---|---|---|
| Focal length | 24.69 | 37.63 | 67.88 |
| F-number | 2.91 | 2.91 | 2.91 |
| Half angle of view (degrees) | 41.23 | 29.90 | 17.68 |
| Image height | 21.64 | 21.64 | 21.64 |
| Total length of zoom lens | 139.21 | 150.29 | 171.74 |
| BF | 13.49 | 22.31 | 35.10 |
| d5 | 1.00 | 11.43 | 27.77 |
| d10 | 7.92 | 7.31 | 6.15 |
| d12 | 11.27 | 6.48 | 2.00 |
| d19 | 5.82 | 3.04 | 1.00 |
| d41 | 13.49 | 22.31 | 35.10 |

Lens unit data

| Unit | First surface | Focal length |
|---|---|---|
| 1 | 1 | 105.46 |
| 2 | 6 | −29.04 |
| 3 | 11 | −58.47 |
| 4 | 13 | 58.34 |
| 5 | 20 | 36.27 |

| Conditional Expression | Parameter | | Example 1 | Example 2 | Example 3 | Example 4 | Example 5 |
|---|---|---|---|---|---|---|---|
| (1) | vd | LPL1 | 94.7 | 94.7 | 94.7 | 81.5 | 94.7 |
| | | LPL2 | 67.7 | 67.7 | 67.7 | 67.7 | 67.7 |
| | | LPL3 | — | 81.5 | 81.5 | 81.5 | 81.5 |
| | | LPL4 | — | — | — | 70.2 | 81.6 |
| (2) | Nd | LPH | 1.850 | 2.001 | 2.001 | 2.001 | 2.051 |
| (3) | tn/skw | | 1.139 | 1.903 | 1.928 | 2.842 | 3.862 |
| (4) | $f_n \times \Sigma \Phi LPL$ | | 1.688 | 1.910 | 1.948 | 2.216 | 3.185 |
| (5) | $f_n \times \Phi LPH$ | | 0.955 | 1.162 | 1.209 | 1.107 | 0.372 |
| (6) | $f1/f_m$ | | −5.384 | −5.582 | −5.594 | −5.782 | −6.922 |
| (7) | $f_{n-1}/f_n$ | | 1.108 | 1.158 | 1.088 | 1.310 | 1.608 |
| (8) | $f_m/f_w$ | | −0.679 | −0.656 | −0.709 | −0.723 | −0.617 |
| (9) | $f_n/f_w$ | | 1.683 | 1.452 | 1.571 | 1.389 | 1.469 |
| (10) | βmt | | −0.452 | −0.442 | −0.392 | −0.403 | −0.309 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-134419, filed Jul. 10, 2017, and Japanese Patent Application No. 2018-108495, filed Jun. 6, 2018, which are hereby incorporated by reference herein in their entirety.

What is claimed is:

1. A zoom lens comprising a plurality of lens units, in which an interval between each pair of adjacent lens units is changed during zooming,
wherein the plurality of lens units consist of, in order from an object side to an image side, a first lens unit having a positive refractive power, an intermediate lens group including at least one lens unit and having a negative refractive power as a whole, an (n−1)-th lens unit having a positive refractive power, and an n-th lens unit having a positive refractive power,
wherein the first lens unit is configured to move during zooming,
wherein an interval between the (n−1)-th lens unit and the n-th lens unit is smaller at a telephoto end than at a wide angle end,
wherein the n-th lens unit includes three or more positive lenses LPL made of a material that satisfies the following conditional expression:

$$65.0 < \nu d < 97.0,$$

where νd is an Abbe number of the material of the three or more positive lenses LPL,
wherein the n-th lens unit includes at least one positive lens LPH arranged on the image side of the three or more positive lenses LPL and made of a material that satisfies the following conditional expression:

$$1.84 < Nd < 2.20,$$

where Nd is a refractive index of the at least one material of the positive lens LPH, and
wherein the following conditional expression is satisfied:

$$1.1 < tn/skw < 10.0,$$

where tn is a distance on an optical axis from a lens surface closest to the object side of the n-th lens unit to a lens surface closest to the image side of the n-th lens unit, and skw is a back focus at the wide angle end.

2. The zoom lens according to claim 1, wherein the following conditional expression is satisfied:

$$0.5 < f_n \times \Sigma \Phi LPL < 5.0,$$

where $f_n$ is a focal length of the n-th lens unit, and $\Sigma \Phi PL$ represents a sum of refractive powers of the three or more positive lenses LPL.

3. The zoom lens according to claim 1,
wherein the at least one positive lens LPH consists of one positive lens LPH, and
wherein the following conditional expression is satisfied:

$$0.2 < f_n \times \Phi LPH < 2.0,$$

where $f_n$ is a focal length of the n-th lens unit, and ΦLPH is a refractive power of the one positive lens LPH.

4. The zoom lens according to a claim 1,
wherein the at least one positive lens LPH includes a plurality of positive lenses LPH, and
wherein the following conditional expression is satisfied:

$$0.2 < f_n \times \Phi LPH < 2.0,$$

where $f_n$ is a focal length of the n-th lens unit, and ΦLPH is a refractive power of a positive lens LPH arranged closest to the image side of the plurality of positive lenses LPH.

5. The zoom lens according to claim 1, wherein the following conditional expression is satisfied:

$$-8 < f_1/f_m < -4,$$

where $f_1$ is a focal length of the first lens unit, and $f_m$ is a focal length of the intermediate lens group at the wide angle end.

6. The zoom lens according to claim 1, wherein the following conditional expression is satisfied:

$$0.9 < f_{n-1}/f_n < -2.0,$$

where $f_{n-1}$ is a focal length of the (n−1)-th lens unit, and $f_n$ is a focal length of the n-th lens unit.

7. The zoom lens according to claim 1, wherein the following conditional expression is satisfied:

$$-0.90 < f_m/fw < -0.45,$$

where $f_m$ is a focal length of the intermediate lens group at the wide angle end, and $f_w$ is a focal length of the zoom lens at the wide angle end.

8. The zoom lens according to claim 1, wherein the following conditional expression is satisfied:

$$1.1 < f_n/f_w < 1.9,$$

where $f_n$ is a focal length of the n-th lens unit, and $f_w$ is a focal length of the zoom lens at the wide angle end.

9. The zoom lens according to claim 1, wherein the following conditional expression is satisfied:

$$-0.6 < \beta mt < -0.2,$$

where βmt is a lateral magnification of the intermediate lens group at the telephoto end.

10. The zoom lens according to claim 1,
wherein the intermediate lens group consists of a second lens unit having a negative refractive power arranged adjacent to and on the image side of the first lens unit, and
wherein the second lens unit is configured to move during focusing.

11. The zoom lens according to claim 1,
wherein the intermediate lens group consists of a second lens unit having a negative refractive power arranged adjacent to and on the image side of the first lens unit, and a third lens unit having a negative refractive power arranged on the image side of the second lens unit, and
wherein the third lens unit is configured to move during focusing.

12. The zoom lens according to claim 1, wherein an interval between a lens unit arranged adjacent to and on the object side of the (n−1)-th lens unit and the (n−1)-th lens unit is smaller at the telephoto end than at the wide angle end.

13. The zoom lens according to claim 1,
wherein the intermediate lens group includes a second lens unit having a negative refractive power arranged adjacent to and on the image side of the first lens unit, and
wherein an interval between the first lens unit and the second lens unit is larger at the telephoto end than at the wide angle end.

14. The zoom lens according to claim 1, wherein at least a part of the n-th lens unit is configured to move in a direction having a component in a direction perpendicular to the optical axis during image blur correction.

15. An image pickup apparatus comprising:
the zoom lens according to claim 1; and
an image pickup element configured to receive an image formed by the zoom lens.

16. A zoom lens comprising a plurality of lens units, in which an interval between each pair of adjacent lens units is changed during zooming,
wherein the plurality of lens units consist of, in order from an object side to an image side, a first lens unit having a positive refractive power, an intermediate lens group including at least one lens unit and having a negative refractive power as a whole, an (n-1)-th lens unit having a positive refractive power, and an n-th lens unit having a positive refractive power,
wherein the first lens unit is configured to move during zooming,
wherein an interval between the (n-1)-th lens unit and the n-th lens unit is smaller at a telephoto end than at a wide angle end,
wherein the n-th lens unit includes a plurality of positive lenses LPL made of a material that satisfies the following conditional expression:

$65.0 < vd < 97.0$, where vd is an Abbe number of the material of the plurality of positive lenses LPL,
wherein the n-th lens unit includes at least one positive lens LPH arranged on the image side of the plurality of positive lenses LPL and made of a material that satisfies the following conditional expression:

$1.84 < Nd < 2.20$, where Nd is a refractive index of the material of the at least one positive lens LPH, and
wherein the following conditional expressions are satisfied:

$1.1 < tn/skw < 10.0$, and $1.452 < f_n/f_w < 1.9$, where tn is a distance on an optical axis from a lens surface closest to the object side of the n-th lens unit to a lens surface closest to the image side of the n-th lens unit, skw is a back focus at the wide angle end, $f_n$ is a focal length of the n-th lens unit, and $f_w$, is a focal length of the zoom lens at the wide angle end.

17. The zoom lens according to claim 16,
wherein the at least one positive lens LPH consist of one positive lens LPH, and
wherein the following conditional expression is satisfied:

$0.2 < f_n + \Phi LPH < 2.0$, where $f_n$ is a focal length of the n-th lens unit, and $\Phi$LPH is a refractive power of the one positive lens LPH.

18. The zoom lens according to a claim 16,
wherein the at least one positive lens LPH includes a plurality of positive lenses LPH, and
wherein the following conditional expression is satisfied:

$0.2 < f_n + \Phi LPH < 2.0$, where $f_n$ is a focal length of the n-th lens unit, and $\Phi$LPH is a refractive power of a positive lens LPH arranged closest to the image side of the plurality of positive lenses LPH.

19. A zoom lens comprising a plurality of lens units, in which an interval between each pair of adjacent lens units is changed during zooming,
wherein the plurality of lens units consist of, in order from an object side to an image side, a first lens unit having a positive refractive power, an intermediate lens group including at least one lens unit and having a negative refractive power as a whole, an (n-1)-th lens unit having a positive refractive power, and an n-th lens unit having a positive refractive power,
wherein the first lens unit is configured to move during zooming,
wherein an interval between the (n-1)-th lens unit and the n-th lens unit is smaller at a telephoto end than at a wide angle end,
wherein the n-th lens unit includes a plurality of positive lenses LPL made of a material that satisfies the following conditional expression:

$65.0 < vd < 97.0$, where vd is an Abbe number of the material of the plurality of positive lenses LPL,
wherein the n-th lens unit includes at least one positive lens LPH arranged on the image side of the plurality of positive lenses LPL and made of a material that satisfies the following conditional expression:

$1.84 < Nd < 2.20$, where Nd is a refractive index of the material of the at least one positive lens LPH, and
wherein the following conditional expressions are satisfied:

$1.1 < tn/skw < 10.0$, and $-8 < f_1/f_m < -5.3$, where tn is a distance on an optical axis from a lens surface closest to the object side of the n-th lens unit to a lens surface closest to the image side of the n-th lens unit, skw is a back focus at the wide angle end, $f_1$ is a focal length of the first lens unit, and $f_m$ is a focal length of the intermediate lens group at the wide angle end.

* * * * *